(12) United States Patent
Goetz et al.

(10) Patent No.: US 11,299,065 B2
(45) Date of Patent: Apr. 12, 2022

(54) CHARGING OF AN ENERGY STORE

(71) Applicant: Dr. Ing. h.c. F. Porsche Aktiengesellschaft, Stuttgart (DE)

(72) Inventors: Stefan Goetz, Forstern (DE); Hermann Helmut Dibos, Remchingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 47 days.

(21) Appl. No.: 16/757,359

(22) PCT Filed: Jun. 12, 2018

(86) PCT No.: PCT/EP2018/025157
§ 371 (c)(1),
(2) Date: Apr. 17, 2020

(87) PCT Pub. No.: WO2019/076480
PCT Pub. Date: Apr. 25, 2019

(65) Prior Publication Data
US 2020/0338997 A1 Oct. 29, 2020

(30) Foreign Application Priority Data
Oct. 17, 2017 (DE) .................. 10 2017 124 125.6

(51) Int. Cl.
*H02J 7/00* (2006.01)
*B60L 58/19* (2019.01)
*B60L 53/24* (2019.01)

(52) U.S. Cl.
CPC .............. *B60L 58/19* (2019.02); *B60L 53/24* (2019.02); *H02J 7/0016* (2013.01); *H02J 7/0024* (2013.01); *Y02T 90/14* (2013.01)

(58) Field of Classification Search
CPC ........ B60L 58/19; B60L 53/24; H02J 7/0024; H02J 7/0016; Y02T 90/14
(Continued)

(56) References Cited

U.S. PATENT DOCUMENTS 10,186,861 B2    1/2019  Rapp et al.
10,439,506 B2   10/2019  Goetz
(Continued)

FOREIGN PATENT DOCUMENTS

DE    10 2011 004 248    8/2011
DE    10 2010 041 075    3/2012
(Continued)

OTHER PUBLICATIONS

International Search Report dated Aug. 9, 2018.

*Primary Examiner* — Zixuan Zhou
(74) *Attorney, Agent, or Firm* — Gerald E. Hespos; Michael J. Porco; Matthew T. Hespos

(57) ABSTRACT

A method for charging an energy store that has at least three energy storage strings each having plural energy storage modules. The energy storage modules have at least one energy storage element that receives and stores energy from an energy source and at least two switching elements. The energy store is connected to an energy source that provides a charging voltage and to an electric machine, and the energy storage modules are supplied with energy by the energy source. A DC voltage source and/or an AC voltage source are used in a selectable manner as energy source and the energy store is matched to properties of the selected energy source by switching the switching elements. Thus, the energy storage modules of a string are connected in parallel and/or in series with one another and/or at least one energy storage module of at least one energy storage string is bypassed.

13 Claims, 26 Drawing Sheets

(58) Field of Classification Search
USPC .................................................. 320/116–119
See application file for complete search history.

(56) References Cited

U.S. PATENT DOCUMENTS

| | | |
|---|---|---|
| 2011/0198936 A1 | 8/2011 | Graovac et al. |
| 2013/0241447 A1* | 9/2013 | Feuerstack .............. B60L 53/24 318/139 |
| 2013/0257355 A1 | 10/2013 | Feuerstack et al. |
| 2013/0307445 A1* | 11/2013 | Feuerstack .............. B60L 50/51 318/139 |
| 2014/0226377 A1 | 8/2014 | Goetz et al. |
| 2016/0368392 A1 | 12/2016 | Braun et al. |
| 2018/0013339 A1 | 1/2018 | Goetz |
| 2018/0219478 A1 | 8/2018 | Goetz |

FOREIGN PATENT DOCUMENTS

| | | |
|---|---|---|
| DE | 10 2010 041 077 | 3/2012 |
| DE | 10 2010 052 934 | 5/2012 |
| DE | 10 2011 003 869 | 8/2012 |
| DE | 10 2011 108 920 | 1/2013 |
| DE | 10 2013 212 682 | 12/2014 |
| DE | 10 2013 212 692 | 12/2014 |
| DE | 10 2013 212 716 | 12/2014 |
| DE | 10 2015 112 513 | 2/2017 |
| DE | 10 2016 112 250 | 1/2018 |

\* cited by examiner

CHARGING OF AN ENERGY STORE

BACKGROUND

Field of the Invention

The invention relates to a method and to an apparatus for charging an energy store, in particular a battery of a vehicle, and to a corresponding vehicle.

Related Art

In order to become independent or more independent of fossil fuels, modern vehicles are increasingly having electric motors installed in them that independently drive the vehicle or assist an existing internal combustion engine. The electric motors are usually supplied with power by one or more batteries. These batteries need to be charged after their energy reserve has been used up.

DE 10 2013 212 692 A1 discloses a system having an energy storage device and a DC voltage supply circuit, wherein the energy storage device has at least two energy supply paths, wherein each of the energy supply paths has a multiplicity of energy storage modules connected in series. Two charging circuit connections of the DC voltage supply circuit that are connected in series with supply nodes can be used to connect a charging circuit. The charging circuit can have a current applied to its charging circuit connections and can be designed to provide a DC charging voltage or a pulsed charging voltage having a defined mean value for the energy storage modules of the energy storage device.

DE 10 2013 212 682 A1 and DE 10 2013 212 716 A1 disclose similar systems relating to the charging of battery modules.

The systems known from the prior art make a DC voltage available as a charging voltage for the energy store. This restricts the charging options for the energy store.

It is therefore an object of the present invention to address at least one of the disadvantages of the prior art. In particular, the aim is to specify at least one option to allow charging of the energy store independently of a specific prescribed energy source. The aim is at least to propose an alternative to known solutions.

SUMMARY

According to the invention, the object is achieved by a method and an apparatus for charging an energy store in accordance with the independent claims. Further respective refinements can be found in the respective dependent claims and the description below.

The invention therefore proposes a method for charging an energy store, in which an energy store that has a plurality of, preferably at least three, energy storage strings each having a plurality of energy storage modules is charged, wherein the respective energy storage modules comprise at least one energy storage element, which receives energy from an energy source and stores it, and at least two switching elements, in which the energy store is electrically connected to the energy source that provides a charging voltage and to an electric machine and the energy storage modules are supplied with energy by the energy source, wherein a DC voltage source and/or an AC voltage source is used in a freely selectable manner as energy source and the energy store is matched to properties of the selected energy source by switching the switching elements, as a result of which the respective energy storage modules, or the respective energy storage elements thereof, of an energy storage string are each connected in parallel and/or in series with one another and/or at least one of the energy storage modules is bypassed.

In a bypass circuit, the current is fed past the respective energy storage element of an energy storage module so that no current flows through the energy storage element. The energy storage element is bypassed as a result.

As a result of the fact that the energy store is matched to the respective energy source or energy supply device, the energy store is independent of present energy sources, that is to say it is not assigned to a specific type of energy source. Instead, the energy store can be charged by way of any energy source available at the moment at which the energy store is to be charged. This is achieved by virtue of the energy store being formed as an energy sink in the respective charging circuit.

US 2018/0219478 from the applicant, the full extent of which is included herein by way of reference, discloses an energy storage module that enables the present invention. Multiple such energy storage modules form an energy storage string and multiple such energy storage strings form the energy store. Preferably, the energy store has three energy storage strings. A different number of energy storage strings is also possible, however. Three energy storage strings have the advantage that they allow the energy store to be easily connected to a known three-phase grid and thereby charged.

The particular refinement of the energy store or of the energy storage modules allows the individual energy storage modules of an energy storage string to be interconnected among one another without restriction. As a result, the energy store is able to be matched to the respective selected energy source such that both DC voltage sources and AC voltage sources are considered as suitable energy sources. Furthermore, faulty energy storage modules can be bypassed or intermediate voltages can be realized. A single module in accordance with the aforementioned patent application from the applicant allows what are known as two- and four-quadrant modules, which each permit a multiplicity of interconnection options, and at least the four-quadrant modules permit different directions of polarity.

The method is developed in that the energy store used is an AC battery. An AC battery is made possible for example by interconnecting single modules that are each disclosed in US 2018/0219478 and the German patent applications DE 10 2015 112 513 A1 and DE 10 2016 112 250 A1 from the applicant and, furthermore, also in the documents DE 10 2011 108 920 A1 and DE 10 2010 052 934 A1 and, in particular, also in S. Goetz, A. Peterchev, T. Weyh (2015), Modular multilevel converter with series and parallel module connectivity: Topology and control, IEEE Transactions on Power Electronics, vol. 30, no. 1, pp. 203-215, doi: 10.1109/TPEL.2014.2310225. For this purpose, the single modules, which are called energy storage modules in the present disclosure, have at least one energy storage element, such as for example a battery or a capacitor, and multiple switching elements. The switching elements are arranged in the respective modules such that they permit dynamic changeover of adjacent modules. This means that the multiple switching elements connect adjacent energy storage elements either in parallel or in series with one another or bypass or deactivate a respective energy storage element or a respective energy storage module. As a result of the switching elements required for this purpose being arranged in a respective module, the switching elements can be actuated with a minimum potential difference between the switching elements. This permits the switching elements to be actuated or activated precisely at the same time. The precise switching and the option of connecting adjacent modules in series or in parallel with one another allows such a battery to be dynamically reconfigured during operation, so that the battery can provide DC voltage, AC voltage or other forms of voltage. Conversely, however, this also means that the battery can be charged with DC voltage, AC voltage or other forms of voltage.

One development of the method makes provision for the respective energy storage modules to each be connected in series or each in parallel or at least partly in series and partly in parallel with one another in a respective energy storage string by correspondingly switching the switching elements of the energy storage modules. As a result, depending on the energy source used, intermediate voltages between the sum of the module voltages of all of the energy storage modules of an energy storage string and the module voltage of an individual energy storage module at an energy string can be set. As a result, mixed circuits are also possible, as a result of which current distribution and voltage matching can be realized.

One embodiment of the method is characterized in that at least two energy storage strings are connected in series. This is advantageous since the electric machine can be used as a type of distributor of the current as a result.

Another embodiment of the method is characterized in that the at least three energy storage strings are each connected in parallel with one another. As a result, in each individual energy storage string, the voltage can be matched according to the interconnection of the energy storage modules.

A further embodiment of the method is characterized in that the energy storage modules are charged in a single-phase or three-phase manner. As a result, further options for charging the energy store are provided.

Another embodiment of the method is characterized in that the energy storage modules are charged via a common star point of the energy store. As a result, the charging voltage can be fed into the energy store or into the battery in a centralized manner, namely via the star point.

Another further embodiment of the method is characterized in that a return line of the electrical connection from the energy store to the energy source is connected via a star point of the electric machine. As a result, the electric machine does not have to be electrically isolated from the energy store during the charging operation.

One embodiment of the method makes provision, in the case that an AC voltage source is used as energy source, for the AC voltage source to be DC isolated or alternatively not DC isolated from the energy store. DC isolation offers a higher degree of safety. However, experience has shown that there is not always a need for such a safety device.

One development of the method is characterized in that an output connection of the energy source is directly electrically connected to an input connection of the energy store. As a result, possible losses in additional electrical components are prevented.

Another development of the method makes provision for an output connection of the energy source to be electrically connected to a connection of the electric machine. As a result, further charging options for charging the energy store result according to the configuration of the electric machine.

The invention furthermore propose an apparatus for charging an energy store, having an energy source, which provides a charging voltage, an energy store and an electric machine, in which the energy store is electrically connected to the energy source and to the electric machine, wherein the energy store has a plurality of, preferably at least three, energy storage strings having a plurality of energy storage modules, wherein the respective energy storage modules have at least one energy storage cell or energy storage element, which is designed to receive store and energy from the energy source, and at least two switching elements, wherein the energy source comprises a DC voltage source and/or an AC voltage source and the energy store is able to be matched to the respective selected energy source by switching the switching elements, as a result of which the respective energy storage modules, or the respective energy storage cells thereof, of an energy storage string are each to be connected in parallel and/or in series with one another and/or at least one energy storage module of an energy storage string is or is to be bypassed.

One development of the apparatus is characterized in that the energy source is directly connected to connections of the energy store or to connections of the electric machine in order to provide the charging voltage.

One development of the apparatus makes provision for the respective energy storage modules to each be connected in series or each in parallel or at least partly in series and partly in parallel with one another in a respective energy storage string by correspondingly switching the switching elements of the energy storage modules.

Another configuration of the apparatus is characterized in that at least two energy storage strings are connected in series with one another or in that the at least three energy storage strings are connected in parallel with one another.

The invention moreover relates to a vehicle having an embodiment of the apparatus according to the invention for executing an embodiment of the method according to the invention.

Further advantages and refinements of the invention will emerge from the description and from the appended drawings.

It is understood that the features mentioned above and the features yet to be discussed below may be used not only in the respectively specified combination but also in other combinations or individually without departing from the scope of the present invention.

The invention is illustrated schematically in the drawings based on embodiments and is described schematically and in detail with reference to the drawings, wherein identical elements are provided with identical reference signs.

DETAILED DESCRIPTION

Figure 1:
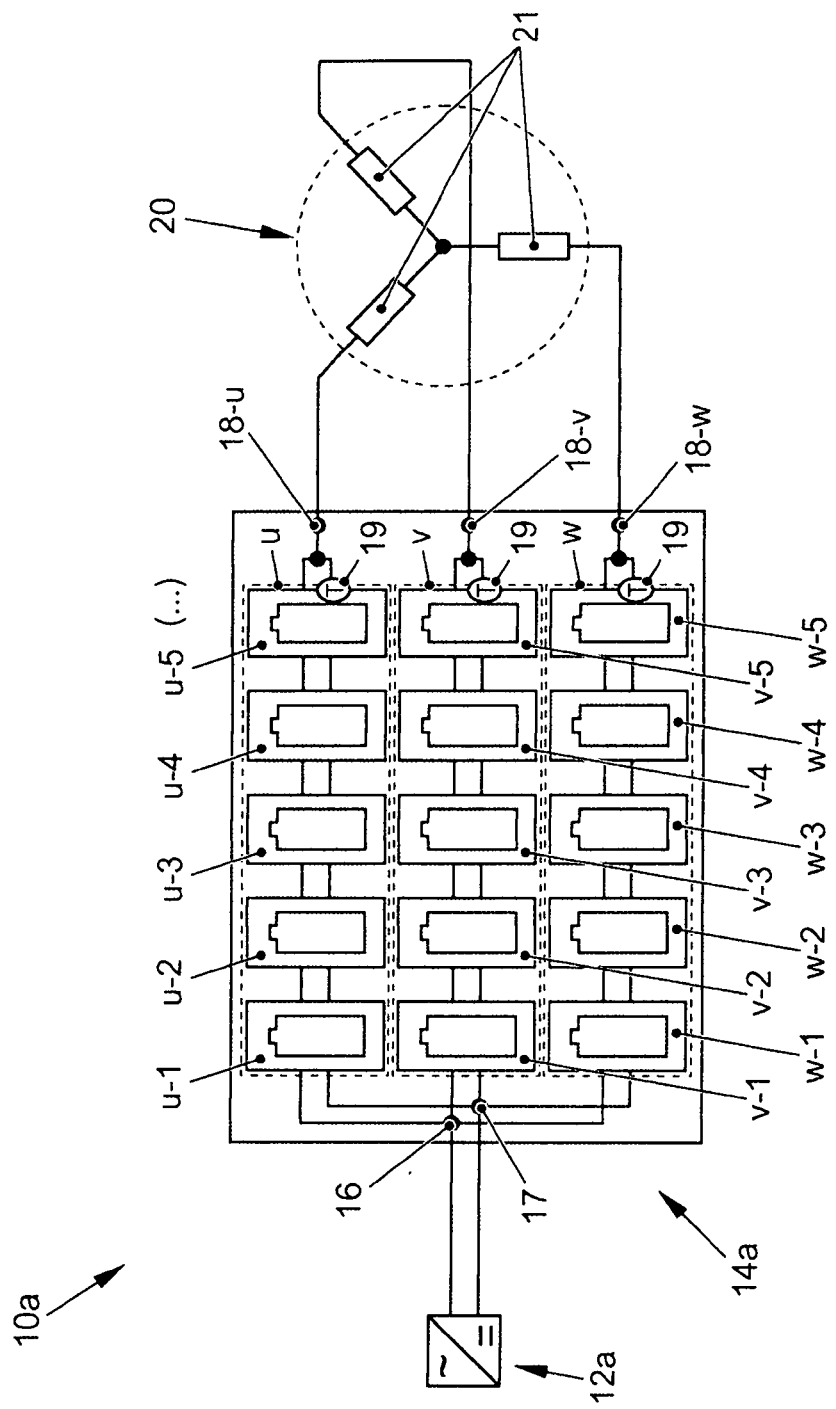
FIG. 1 shows a first circuit diagram according to an embodiment of the method according to the invention for charging an energy store.

The circuit diagram 10a of FIG. 1 shows an energy source 12a. The energy source 12a is a charging device 12a for charging an energy store 14a. The charging device 12a is formed in the embodiment shown in FIG. 1 as a DC voltage source and is illustrated in the form of a rectifier connected to an AC voltage source, which is not shown here. The charging device 12a provides a charging voltage.

The energy store 14a is formed as an AC battery. At this point, it should be pointed out that the terms "energy store", "battery" and "AC battery" are used with the same meaning in the context of this application.

The battery 14a has three energy storage strings u, v and w, which are each bordered with dashed lines. In this respect, the energy storage strings u, v, w can also each be referred to as battery string or simply as string. The strings u, v and w can also be referred to as phase strings of the battery 14a.

Each individual string u, v, w has a plurality of energy storage modules u-1 to u-5, and v-1 to v-5, and w-1 to w-5. The energy storage modules u-1 to u-5, v-1 to v-5, w-1 to w-5 each have a structure that has been disclosed in the aforementioned patent application of the applicant.

Although in the embodiment shown here each string u, v, w has in each case five modules u-1 to u-5, v-1 to v-5, w-1 to w-5, it should be understood that the number of modules in this embodiment and the embodiments still to be described below may be arbitrary, such that each string u, v, w may in each case have u-n, v-n, w-n modules, wherein n corresponds to an arbitrary natural number.

A positive pole of the charging device 12a is electrically connected to the energy store or the battery 14a via a first connection 16 and a negative pole of the charging device 12a is electrically connected to the battery 14a via a second connection 17. Each string u, v, w has respective connections 18-u, 18-v and 18-w that are connected electrically to one another at a star point SP of an electric machine 20.

The electric machine 20 may be, for example, a motor or an electric motor. The motor 20 has at least three windings or winding connections. Each winding 21 is electrically connected here individually to a connection 18 of the battery 14a. The respective sections of the motor 20 that each have a winding 21 are also referred to as winding strings or phase strings or phases of the motor.

For the charging process of the battery 14a, in the embodiment shown here the modules u-1 to u-5, v-1 to v-5 and w-1 to w-5 are in each case all connected in parallel in a string u, v, w. The strings u, v, w are also connected in parallel.

The lines of the strings u, v, w are each isolated at a point 19 denoted "T" in order to prevent a short circuit. This is achieved, for example, by way of a MOSFET installed in the respective module u-5, v-5 and w-5.

In the embodiment shown here, the DC charging voltage corresponds exactly to the module voltage of a module u-1 to u-5, v-1 to v-5, w-1 to w-5. The individual module voltage is in this case preferably lower than 60 V DC.

In this method for charging the battery 14a, the charging current is correspondingly high because the charging voltage is comparatively low. An advantage of this circuit is that the motor 20 does not have to be isolated from the energy store 14a or does not have to be disconnected since no current flows through the motor 20 in this charging strategy.

Figure 2:
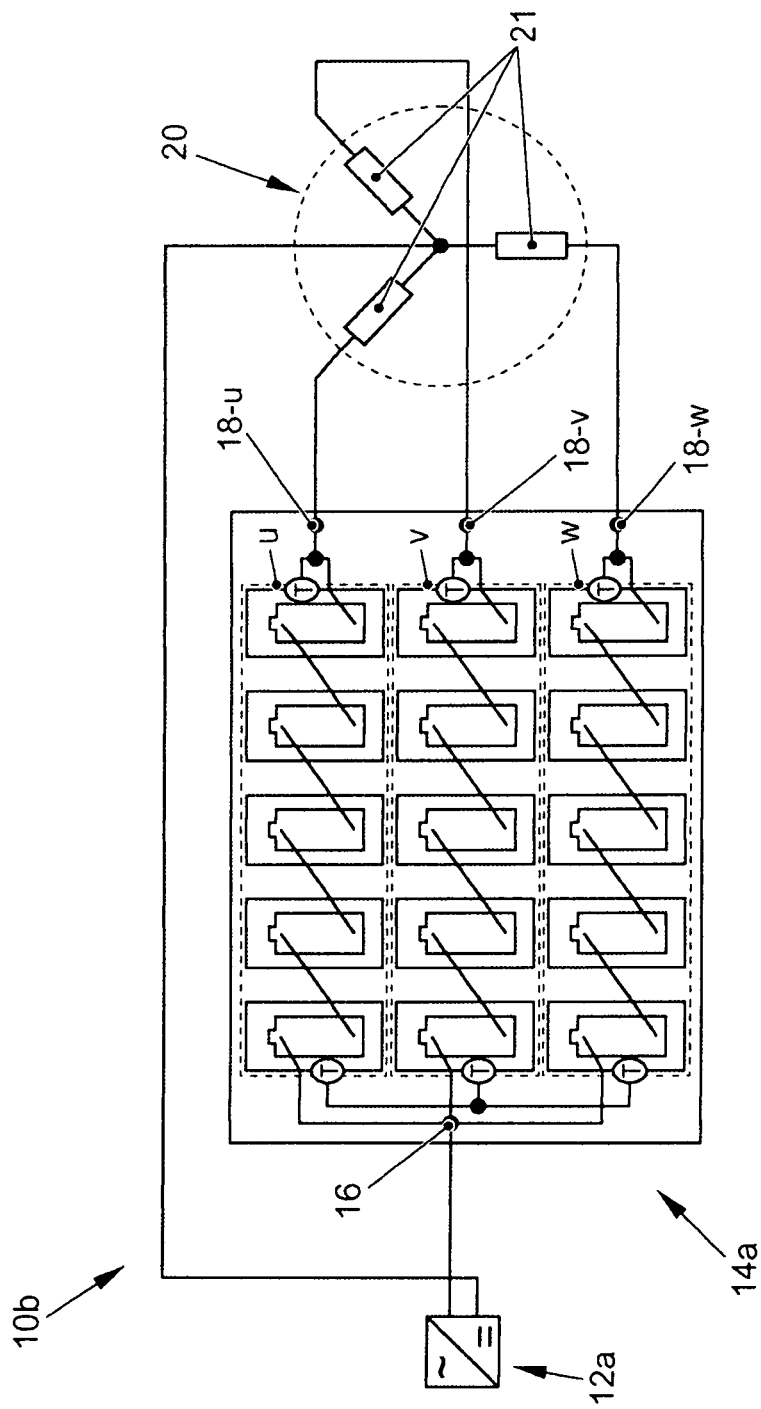
FIG. 2 shows a further circuit diagram according to a further embodiment of the method according to the invention for charging an energy store.

The circuit diagram 10b shown in FIG. 2 shows the energy source 12a or charging device 12a, the energy store 14a or battery 14a and the electric machine 20 or motor 20. The battery 14a corresponds to the battery 14a from FIG. 1 and has three battery strings u, v, w with respective battery modules u-1 to u-5, v-1 to v-5, w-1 to w-5. For the sake of better clarity, the individual components are not provided with reference signs again.

The positive pole of the charging device 12a is electrically connected to the battery 14a via the connection 16 of the battery 14a, which is located here at a common star point of the battery 14a. The strings u, v, w of the battery 14a are connected in parallel with one another. In the embodiment shown in FIG. 2, the respective battery modules of the respective strings are connected in series with one another. In this case, the circuit is isolated at a point denoted by "T" by way of an internal MOSFET. The respective strings u, v, w are connected to connections of the respective winding strings of the motor 20 via the respective connections 18-u, 18-v and 18-w.

The return line back to the charging device 12a is provided in this embodiment via the star point of the motor 20. As a result, additional lines are prevented and the motor 20 does not have to be isolated from the battery 14a. In this embodiment, the DC charging voltage is greater than the sum of the module voltages of a respective string u, v, w. As a result, in this embodiment, the charging process can take place in the high-voltage range.

Figure 3:
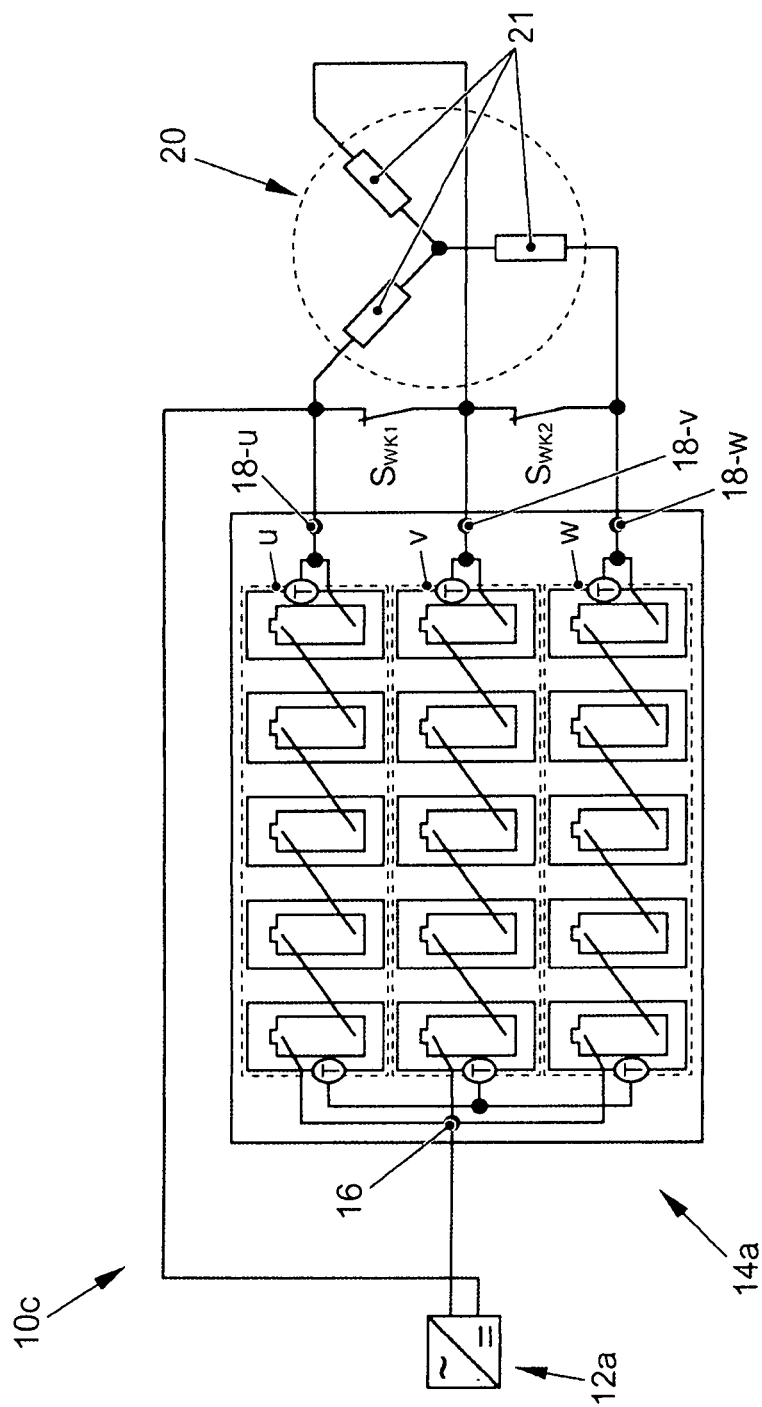
FIG. 3 shows a further circuit diagram according to another embodiment of the method according to the invention for charging an energy store.

The circuit diagram 10c shown in FIG. 3 essentially shows the embodiment of the method according to the invention described in FIG. 2. However, the circuit diagram 10c has two additional circuit breakers SWK1 and SWK2 in addition to the components described in FIG. 2. The switch SWK1 is arranged between the string u and the string v. The switch SWK2 is arranged between the string v and the string w. In addition, an actuation system, which is not shown, for the switches SWK1 and SWK2 is required.

In the embodiment shown in FIG. 3, the switches SWK1 and SWK2 are closed so that the motor 20 is short-circuited by virtue of the individual phases strings or phases of the motor 20 being combined. The return line back to the charging device 12a is therefore provided via the combined phase lines of the motor 20. As a result, the motor 20 does not have to be isolated from the battery 14a. Furthermore, no voltage drops across the windings 21 of the motor 20 occur. Outside of the charging process and to operate the motor 20, the switches SWK1 and SWK2 have to be opened.

Figure 4:
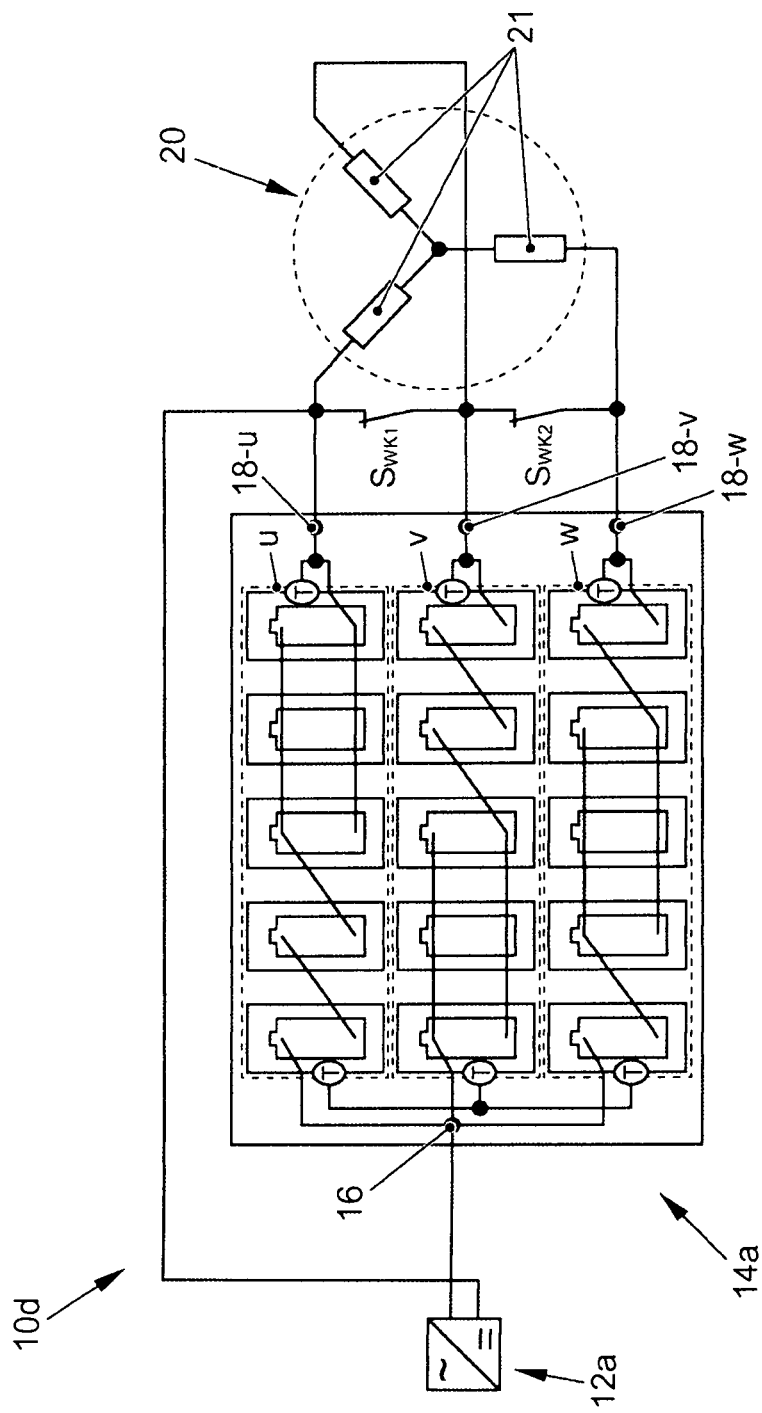
FIG. 4 shows a further circuit diagram according to yet another embodiment of the method according to the invention for charging an energy store.

The circuit diagram 10d shown in FIG. 4 essentially shows the components of the circuit that are described in FIG. 3. The charging device 12a is electrically connected to the battery 14a via the connection 16 and the return line back to the charging device is provided here via the combined phases of the motor 20. In the embodiment shown in FIG. 4, however, the individual modules of the respective strings u, v, w are not exclusively connected in series or parallel with one another but some modules are connected in series and some modules are connected in parallel.

In string u, the module u-1 and the module u-2 are connected in series and the modules u-3, u-4 and u-5 are connected in parallel. In string v, the module v-1, v-2 and v-3 are connected in parallel and the modules v-4 and v-5 are connected in series. In string w, the modules w-2, w-3 and w-4 are connected in parallel, the modules w-1 and the module w-5 are connected in series with the modules w-2, w-3, w-4 connected in parallel. The embodiment shown in FIG. 4 therefore shows a mixed operation. In this case, the voltages in the respective strings u, v, w are equal, but the distribution of the current over the individual modules is different. As a result, intermediate voltages can be switched and balancing between the respective strings and/or the respective modules of the individual strings can be realized.

In the embodiment shown in FIG. 4, the DC charging voltage is lower than or equal to the sum of the module voltages, with the result that even in this embodiment charging can be carried out in the high-voltage range.

Figure 5:
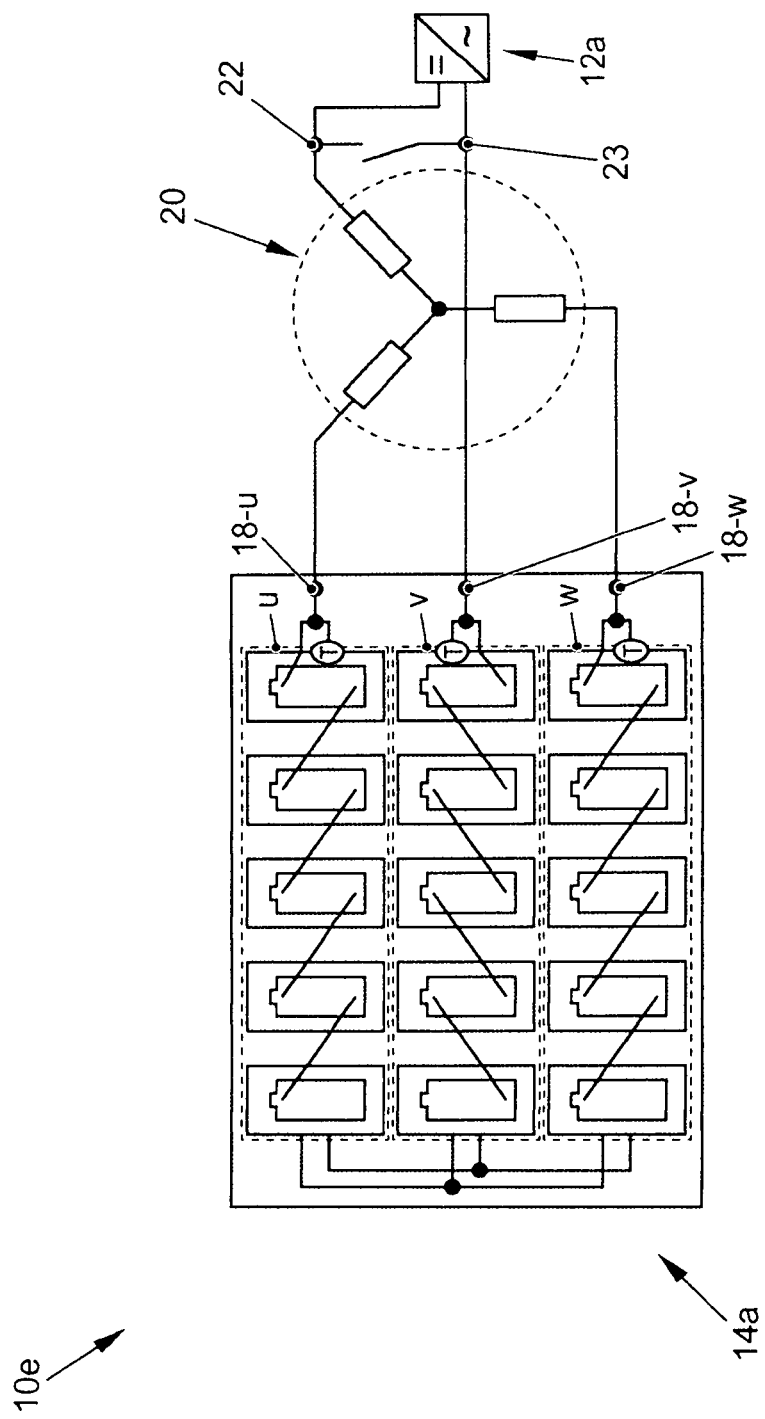
FIG. 5 shows a further circuit diagram according to yet another embodiment of the method according to the invention for charging an energy store.

The circuit diagram 10e of FIG. 5 shows a further option for charging the battery 14a. In this embodiment, the positive pole of the charging device 12a is connected to the motor 20 via a connection 22. The points denoted by "T" indicate an isolation of the line at this point.

In the embodiment shown in FIG. 5, the current is introduced into a phase string of the motor 20 via the connection 22. The phase strings of the motor thereby divide the current so that the current flows into the battery 14a across the connections 18-u and 18-w of the battery 14a.

In the battery 14a, the respective modules of the strings u, v, w are each connected in series. The strings u, v, w are connected in parallel with one another. The current flows back in the direction of the charging device 12a via the string v. In this case, double the current intensity is applied and double the string voltage is applied in the string v compared to the strings u and w. The battery 14a is connected to the negative pole of the charging device 12a via the connection 18-v. In this case, a switch 23 is arranged between the connection 22 and the return conductor to the charging device 12a. During the charging process, a phase of the motor is isolated via the switch 23. If the charging process is terminated, the charging device 12a is disconnected and the switch 23 is closed in order to be able to operate the motor 20.

In this embodiment, too, mixed connections in the respective strings u, v, w are possible, wherein modules in a string u, v, w are connected in parallel and in series with one another, as in the embodiment described in FIG. 4. As a result, adjustments for better current distribution and for voltage adjustment are possible.

The method according to the invention therefore makes it possible to charge an AC battery with a DC voltage source. In this case, an electric machine, such as for example an electric motor, can be integrated in the charging process or not.

However, the method according to invention also makes it possible to charge the AC battery using an AC voltage source, as is described below.

Figure 6A:
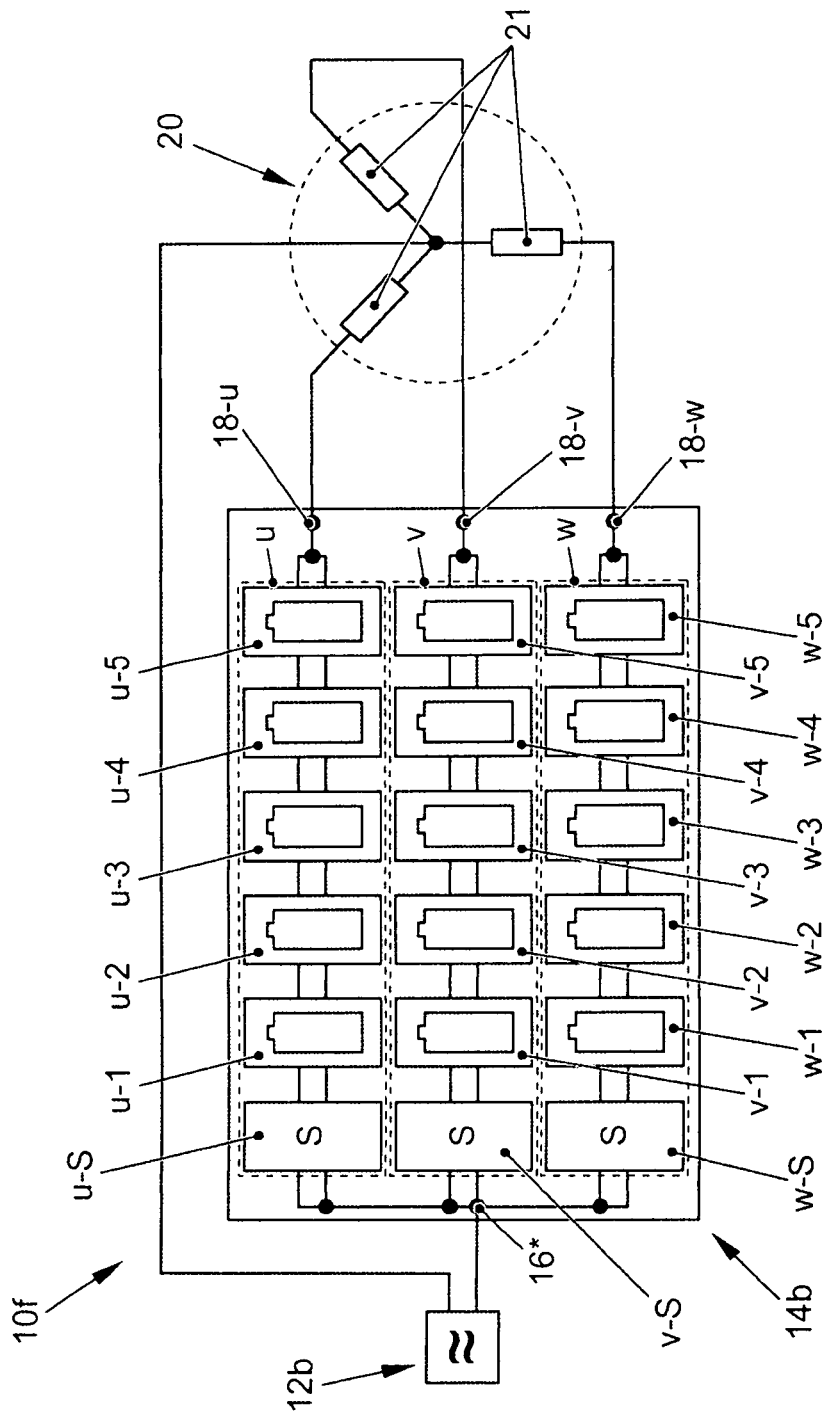
FIGS. 6a and 6b show further circuit diagrams according to embodiments of the method according to the invention for charging an energy store.
Figure 6B:
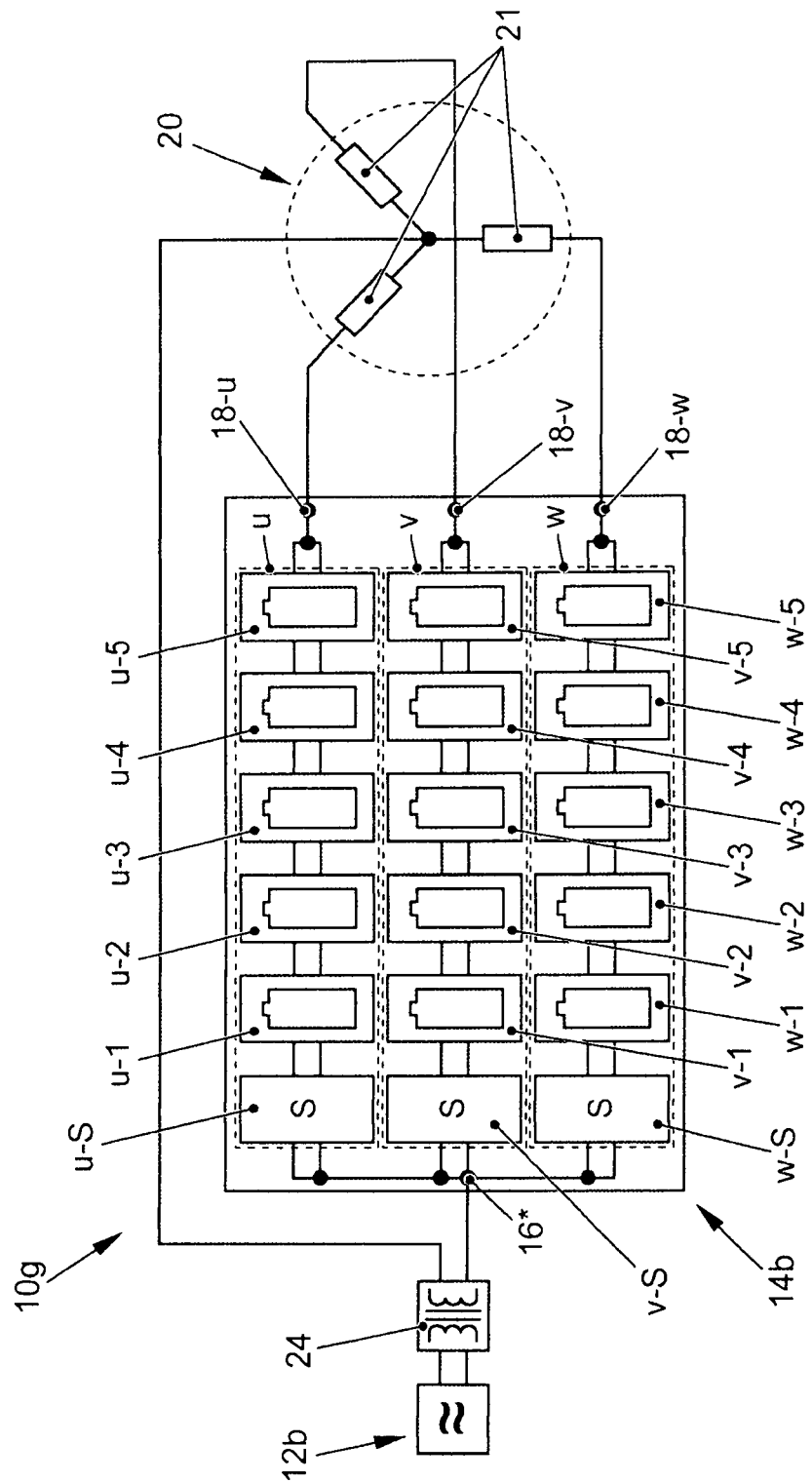

FIGS. 6a and 6b show circuit diagrams 10f and 10g, which illustrate a first option for charging an energy store or a battery 14b with an AC voltage source as energy source 12b. The AC voltage source 12b is electrically connected to the battery 14b via a connection 16*.

The battery 14b has three energy storage strings u, v, w or battery strings u, v, w. The strings u, v, w are connected in parallel with one another. Each of the strings u, v, w has a plurality of energy storage modules u-1, u-2, u-3, u-4, u-5 and v-1, v-2, v-3, v-4, v-5 and w-1, w-2, w-3, w-4, w-5, which are also referred to as battery modules. Each string u, v, w has in addition thereto another switch module u-S, v-S, w-S. Such a respective switch module u-S, v-S, w-S may be, for example, a MOSFET. The MOSFET reduces the shown double tap of the modules u-1, v-1, w-1 to one tap. The respective modules u-1 to u-5 and u-S, v-1 to v-5 and v-S, w-1 to w-5 and w-S are each connected in parallel with one another within the respective string. The strings u, v, w or the battery 14b are electrically connected to a motor 20 via a respective connection 18-u, 18-v, 18-w. The motor 20 corresponds here to the motor 20 illustrated in the figures described above and has three winding or phase strings with the windings 21.

The embodiment shown in FIG. 6b has another transformer 24 connected downstream of the AC voltage source 12b. As a result, the AC voltage source 12b is DC isolated from the energy store 14b, as a result of which safety aspects of the circuit are addressed.

The embodiments shown in FIGS. 6a and 6b allows direct, single-phase charging of the battery 14b. The return line back to the charging device 12b is provided by the star point of the motor 20. To form an AC voltage sink, the battery 14b is regulated upward to the current of the charging device 12b. This means that the battery 14b is matched to the charging device 12b.

Crucial aspects of this charging method are the frequency and voltage of the charging device 12b of the AC voltage provided by same. The respective battery modules u-1 to u-5, v-1 to v-5 and w-1 to w-5 are connected so that the respective strings u, v, w correspond to the frequency and the voltage of the charging device 12b. The charging device 12b provides a charging voltage at a specific frequency. As explained at the outset, the respective battery modules u-1 to u-5, v-1 to v-5 and w-1 to w-5 have a plurality of switching elements, which allow the respective modules u-1 to u-5, v-1 to v-5 and w-1 to w-5 or the energy storage elements arranged in the respective modules to be switched over dynamically between a parallel circuit and/or a series circuit. As a result, respective frequencies and voltages in the respective modules u-1 to u-5, v-1 to v-5 and w-1 to w-5 or the battery strings u, v, w can be set so that the battery 14b can be matched to the provided frequency and voltage of the charging device 12b. The switch modules u-S, v-S and w-S are also necessary for this. Since in each case only a partial voltage is applied to the respective strings u, v, w, the switch modules u-S, v-S and w-S combine the strings u, v, w to form a joint star point of the battery 14b. The AC voltage provided by the charging device 12b can be fed in centrally via the start point of the battery 14b.

Due to the return line via the star point of the motor 20, the motor 20 does not have to be isolated from the battery 14b during the charging process. However, the respective modules of the first voltage stage are decoupled, that is to say they are able to be actuated individually, so that these can be connected in parallel, in series or in a bypassing manner with respective adjacent modules. Otherwise, only a parallel connection would be possible.

Figure 7A:
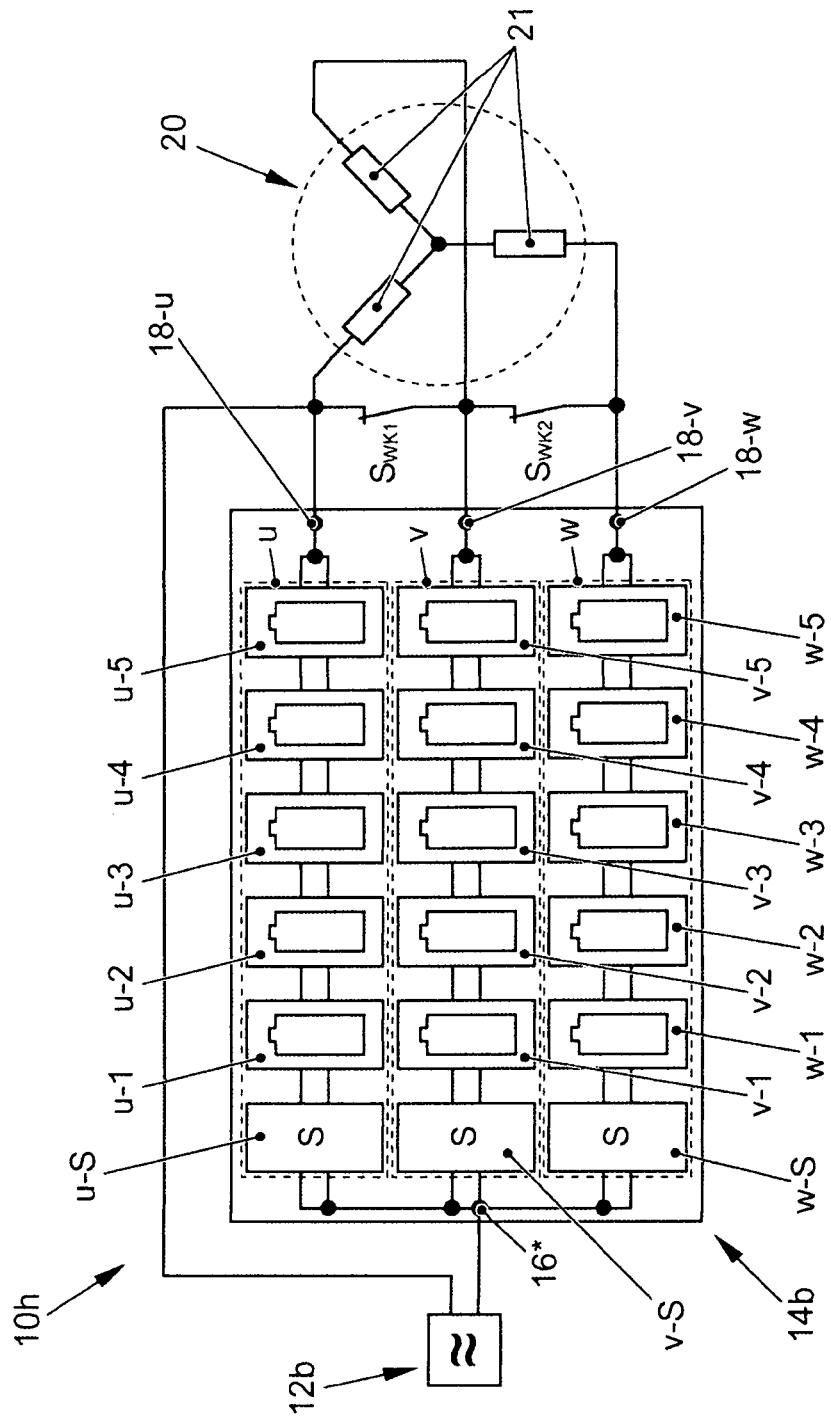
FIGS. 7a and 7b show further circuit diagrams according to further embodiments of the method according to the invention for charging an energy store.
Figure 7B:
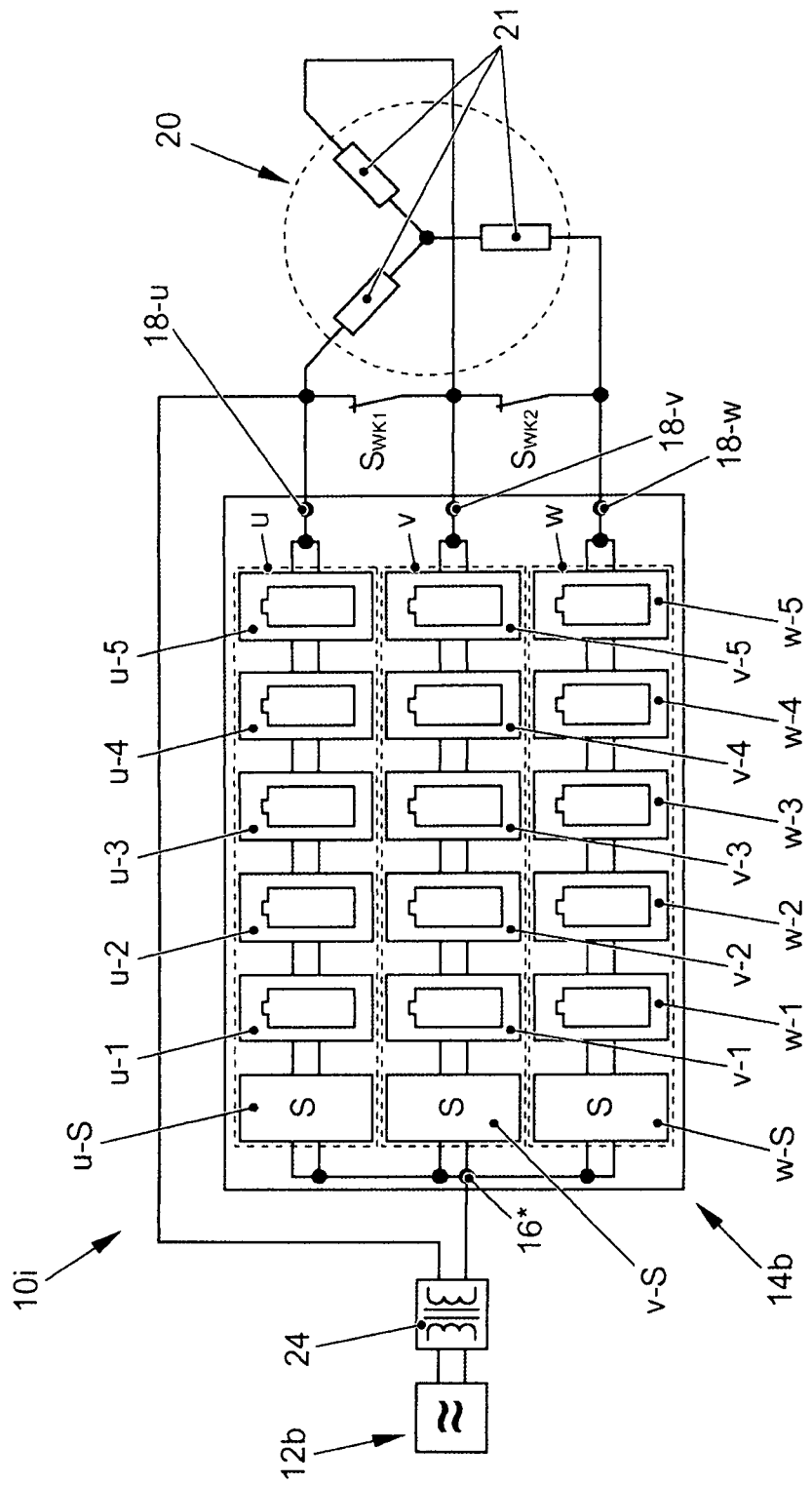

The circuit diagrams 10h and 10i shown in FIGS. 7a and 7b substantially correspond to the circuit diagrams 10f and 10g shown in FIGS. 6a and 6b, wherein the circuit diagrams 10h and 10i of FIGS. 7a and 7b have two switches SWK1, SWK2, which are arranged between the connections 18-u, 18-*v*, 18-*w*, via which connections the battery 14*b* is connected via the respective winding strings to the respective windings 21 of the motor 20. The switch SWK1 is arranged between the connections 18-*u* and 18-*v*. The switch SWK2 is arranged between the connections 18-*v* and 18-*w*. The embodiment shown in FIG. 7*b* has the transformer 24, which DC isolates the AC voltage source 12*b* from the battery 14*b*.

In the embodiments shown in FIGS. 7*a* and 7*b*, the battery 14*b* is charged in a direct, single-phase manner, wherein the motor 20 or the strings with the windings 21 (winding strings) of the motor 20 are short-circuited via the switches SWK1 and SWK2. As a result, the motor 20 does not have to be isolated from the battery 14*b* during the charging process and there are no voltage drops across the windings 21 of the motor 20. The strings are short-circuited by virtue of the switches SWK1 and SWK2 each being closed. An actuation system, which is not shown, of the switches SWK1, SWK2 is possibly required for this purpose. The charging device 12*b* can in this case be connected to the battery 14*b* in a DC isolated manner or in a non-DC isolated manner.

Figure 8A:
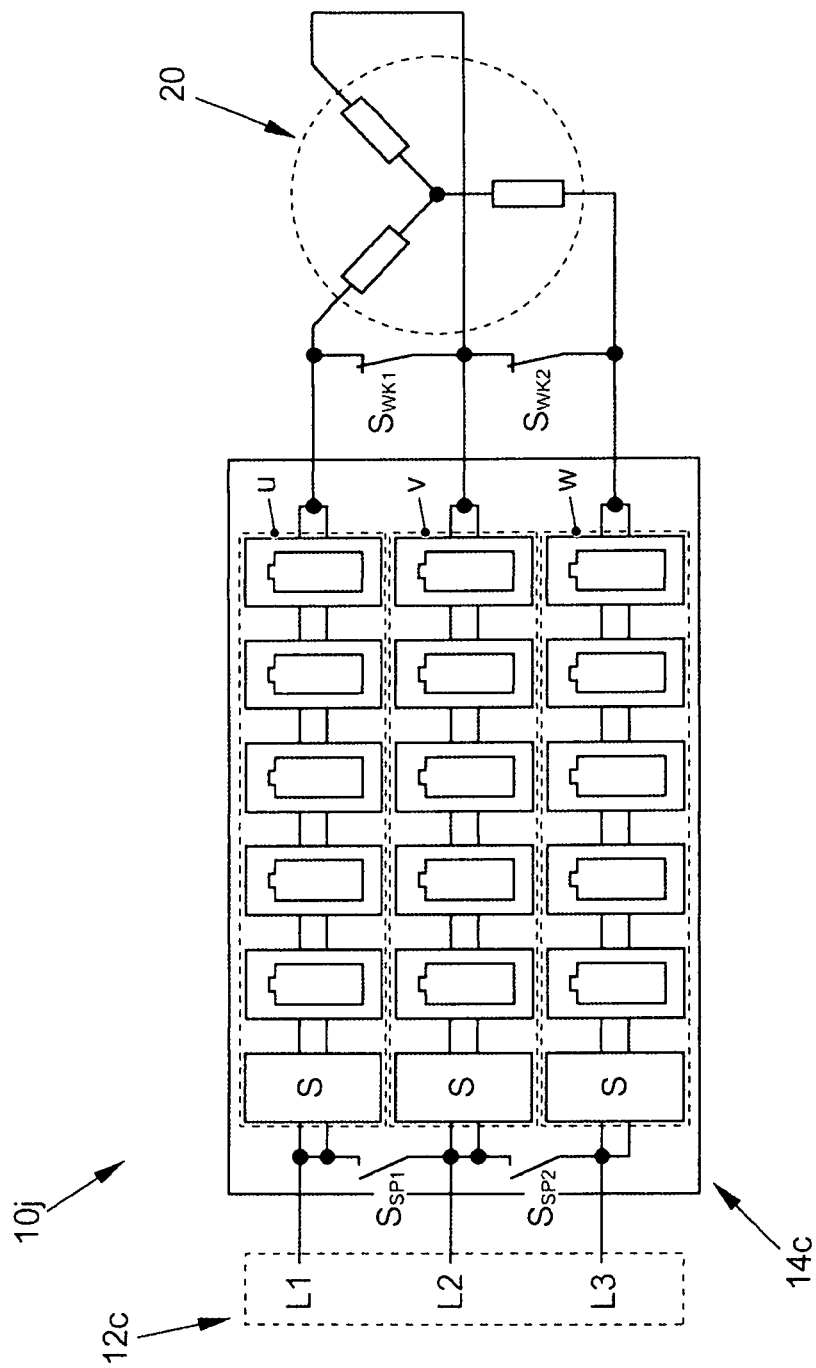
FIGS. 8a and 8b show further circuit diagrams according to other embodiments of the method according to the invention for charging an energy store.
Figure 8B:
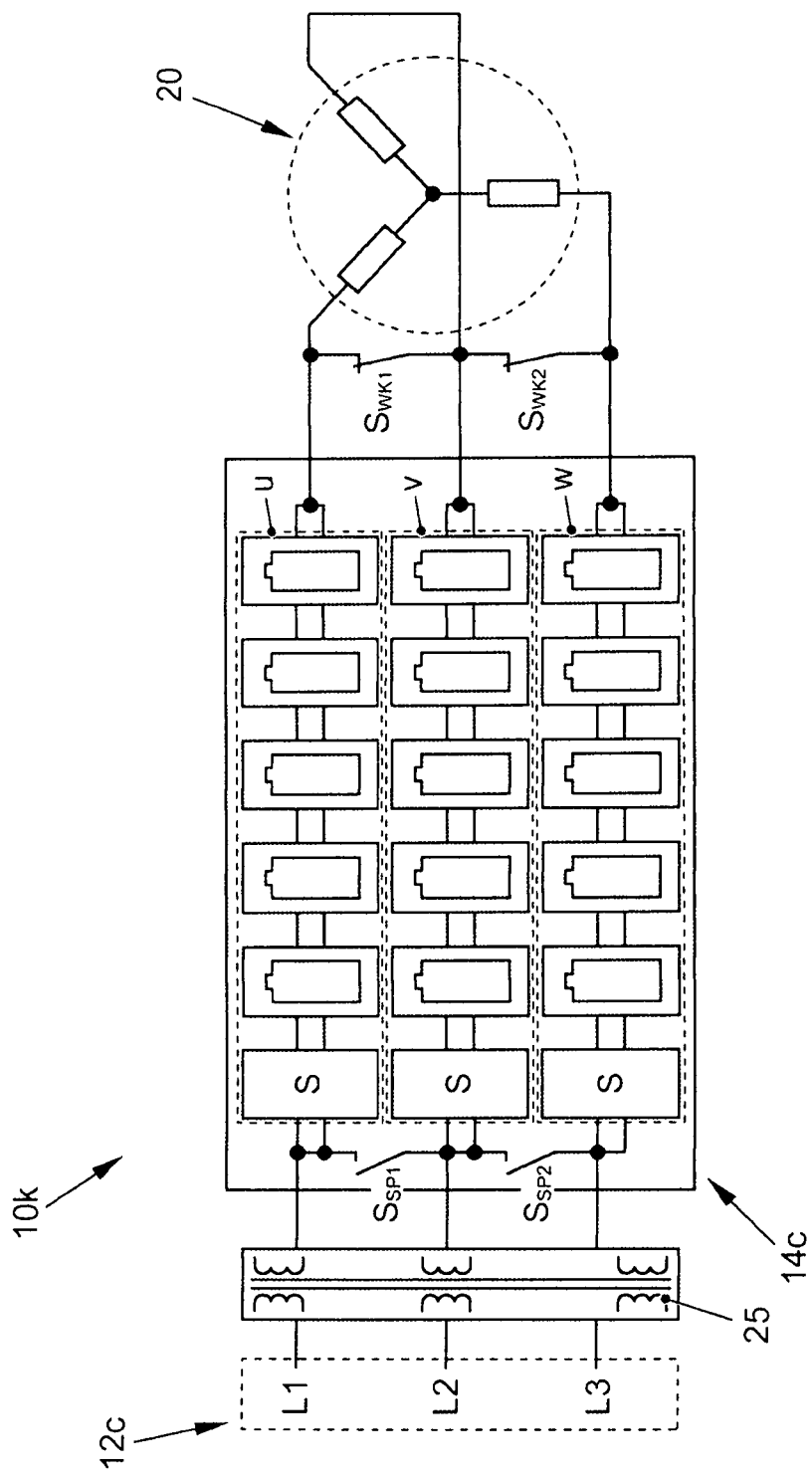

The circuit diagrams 10*j* and 10*k* shown in FIGS. 8*a* and 8*b* show further options for charging an energy store 14*c*, wherein the battery 14*c* is charged in a three-phase manner in the embodiments shown here.

To make this possible, the battery 14*c* has two additional switches SSP1 and SSP2 in addition to the components already described with respect to the batteries 14*a* and 14*b*. The switch SSP1 is arranged between the string u and the string v. The switch SSP2 is arranged between the string v and the string w.

The circuit diagrams 10*j* and 10*k* also have the switches SWK1 and SWK2 at the points already described between the strings of the motor 20 in order to combine the strings of the motor 20.

The battery 14*c* or the strings u, v, w are each connected to a respective phase L1, L2, L3 of a charging device 12*c*. The AC voltage source 12*c* could therefore be a three-phase system. The embodiment shown in FIG. 8*b* has DC isolation by way of a transformer 25 connected downstream of the charging device 12*c*.

The battery 14*c* is charged directly in a three-phase manner by way of the embodiments shown in FIGS. 8*a* and 8*b*. To this end, the switches SSP1 and SSP2 disconnect the star point of the battery 14*c*. This is necessary in order to treat each string u, v, w individually since in each case a phase of the charging device 12*c* that is preferably shifted by 120° is applied to the strings u, v, w. It should be noted here that the phase shift may have any desired value. The switches SWK1 and SWK2 combine the strings of the motor 20, that is to say the motor 20 is short-circuited. On account of the 120° phase shift of the respective phases L1, L2, L3, the value of the vectorial sum of the voltages applied to the motor 20 is 0 V anyway. Therefore, the motor 20 does not necessarily have to be isolated from the battery 14*c* during the charging operation but it must be short-circuited via the switches SWK1 and SWK2. As a result, no voltage drops in the windings of the motor 20 occur. To actuate the switches SSP1, SSP2, SWK1, SWK2, which may each be circuit breakers, an actuation system, not shown, is possibly necessary.

The circuit diagrams 10*l*, 10*m*, 10*n*, 10*o* shown in FIGS. 9*a* to 9*d* show further options for charging an energy store 14*a* or 14*b*, wherein the energy stores 14*a*, 14*b* have each already been described in the preceding figures. In the embodiments shown, the battery 14*a*, 14*b* is charged directly in a three-phase manner, wherein the charging device 12*c* is electrically connected in each case on the motor side to the battery 14*a*, 14*b*. In this case, the respective battery modules are connected in parallel with one another.

The circuit diagrams 10*l* to 10*o* also have two switches S1 and S2, which isolate the motor 20 at two strings of the battery 14*a* or 14*b*. In this case, the switch S1 is arranged between the connection 18-*u* and the corresponding winding string of the motor 20. The switch S2 is arranged between a corresponding winding string 21 of the motor 20 and the electrical connection of connection 18-*v* to phase L2. If the switches S1 and S2 are open, the respective strings of the motor are isolated from the battery 14*a*, 14*b* or from the respective strings u, v. As a result, there are no voltage drops at the windings and no current flows in the motor.

Figure 9A:
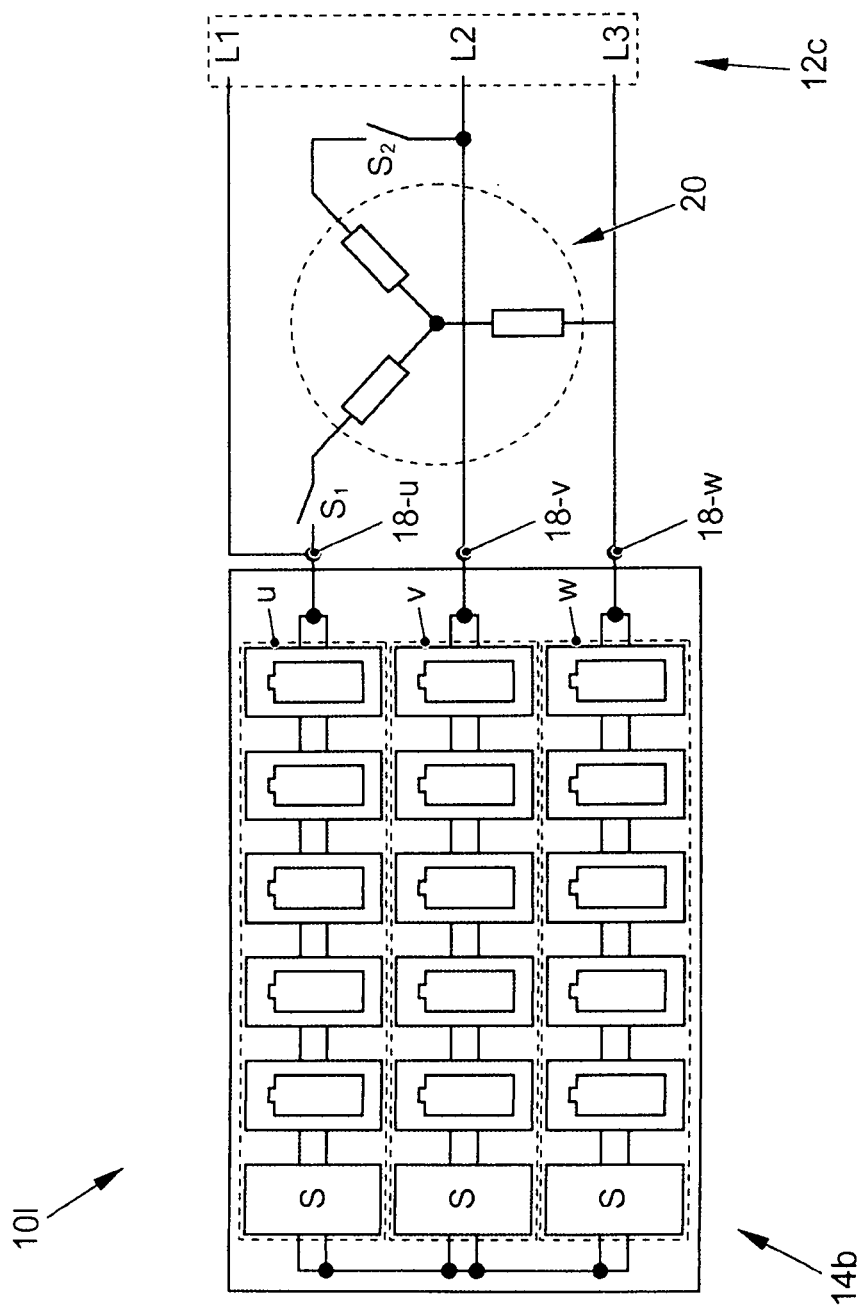
FIGS. 9a to 9d show further circuit diagrams according to yet further embodiments of the method according to the invention for charging an energy store.

The circuit diagram 10*l* of FIG. 9*a* shows the battery 14*b* as has already been described in FIGS. 6 and 7. The charging device 12*c* or the phases L1, L2, L3 are electrically connected to the battery 14*b* via the connections 18-*w*, 18-*v* and 18-*u*. In this case, the phase L1 is electrically connected to the connection 18-*u*, the phase L2 is electrically connected to the connection 18-*v* and the phase L3 is electrically connected to the connection 18-*w*.

Figure 9B:
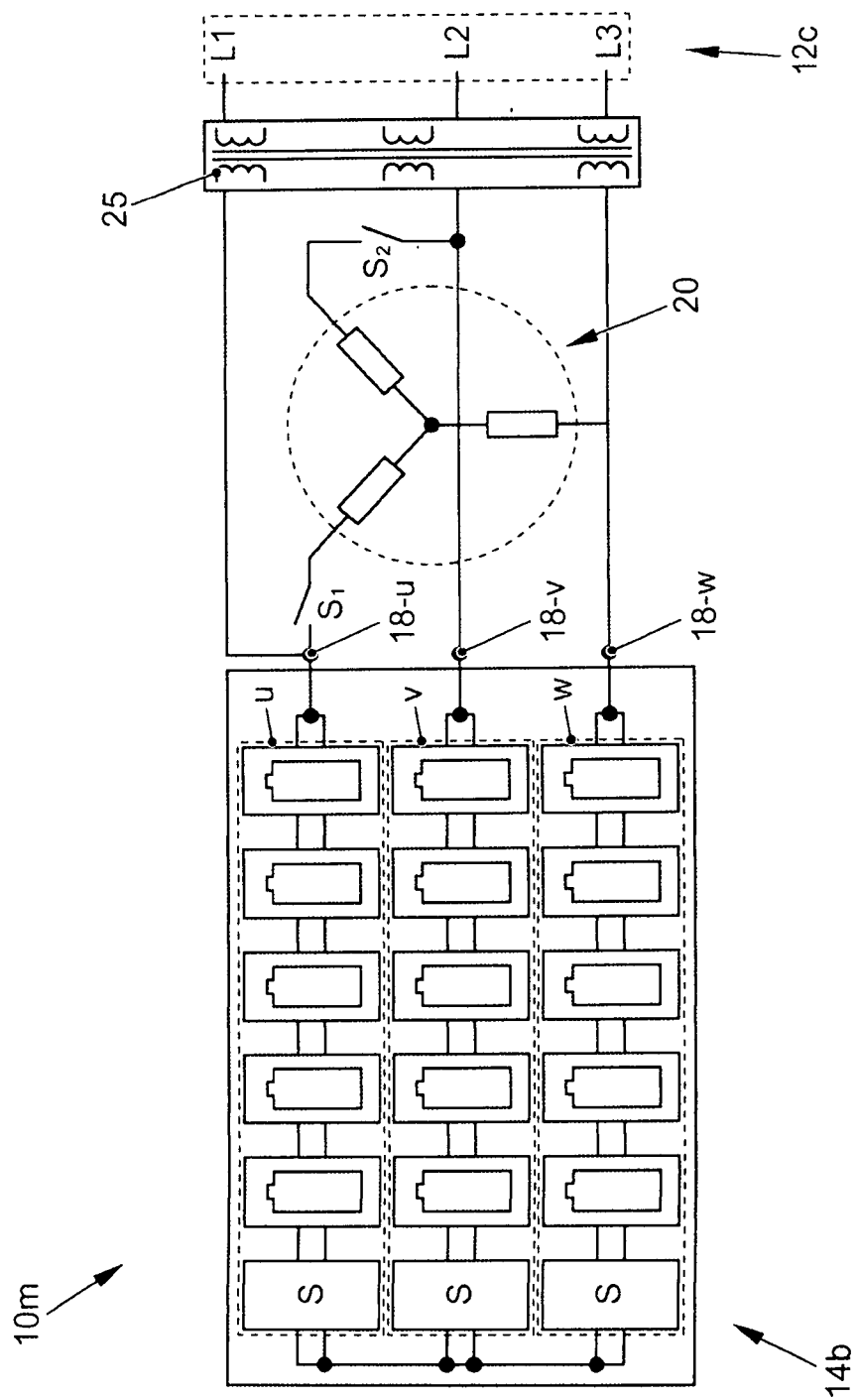

The circuit diagram 10*m* of FIG. 9*b* essentially shows the components known from FIG. 9*a*. In the circuit diagram 10*m*, the charging device 12*c* has a transformer 25 connected downstream of the phases L1, L2 and L3 for the purpose of DC isolation.

In the embodiments of FIGS. 9*a* and 9*b*, the switch modules u-S, v-S and w-S are connected so that the battery 14*b* is charged via a common star point of the battery 14*b*.

Figure 9C:
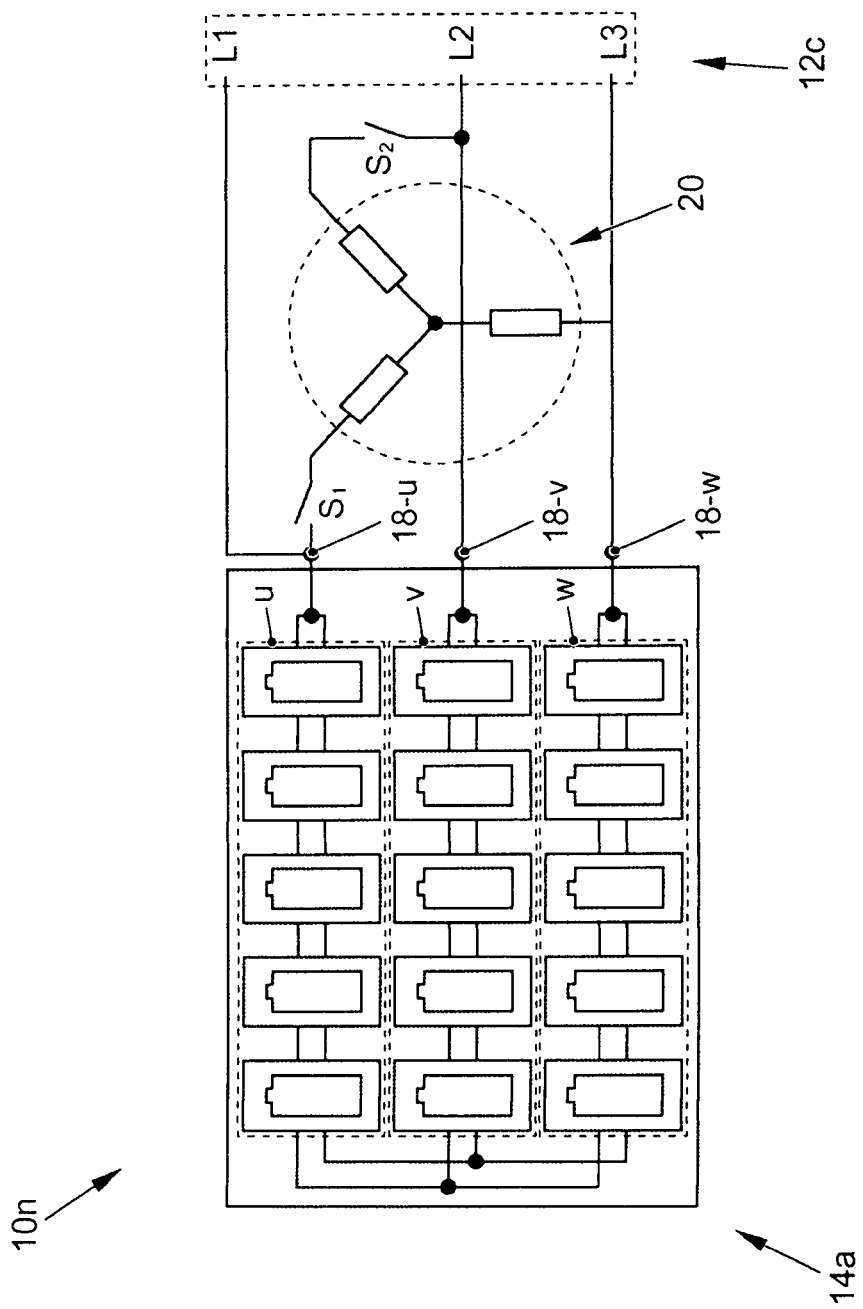

The circuit diagram 10*n* shown in FIG. 9*c* shows and substantially corresponds to the circuit diagram 10*l* of FIG. 9*a*, wherein the battery 14*b* is replaced by the battery 14*a* already described, which does not have any switch modules u-S, v-S and w-S. In this respect, in this embodiment the battery 14*a* is charged via strings u, v, w connected in parallel.

Figure 9D:
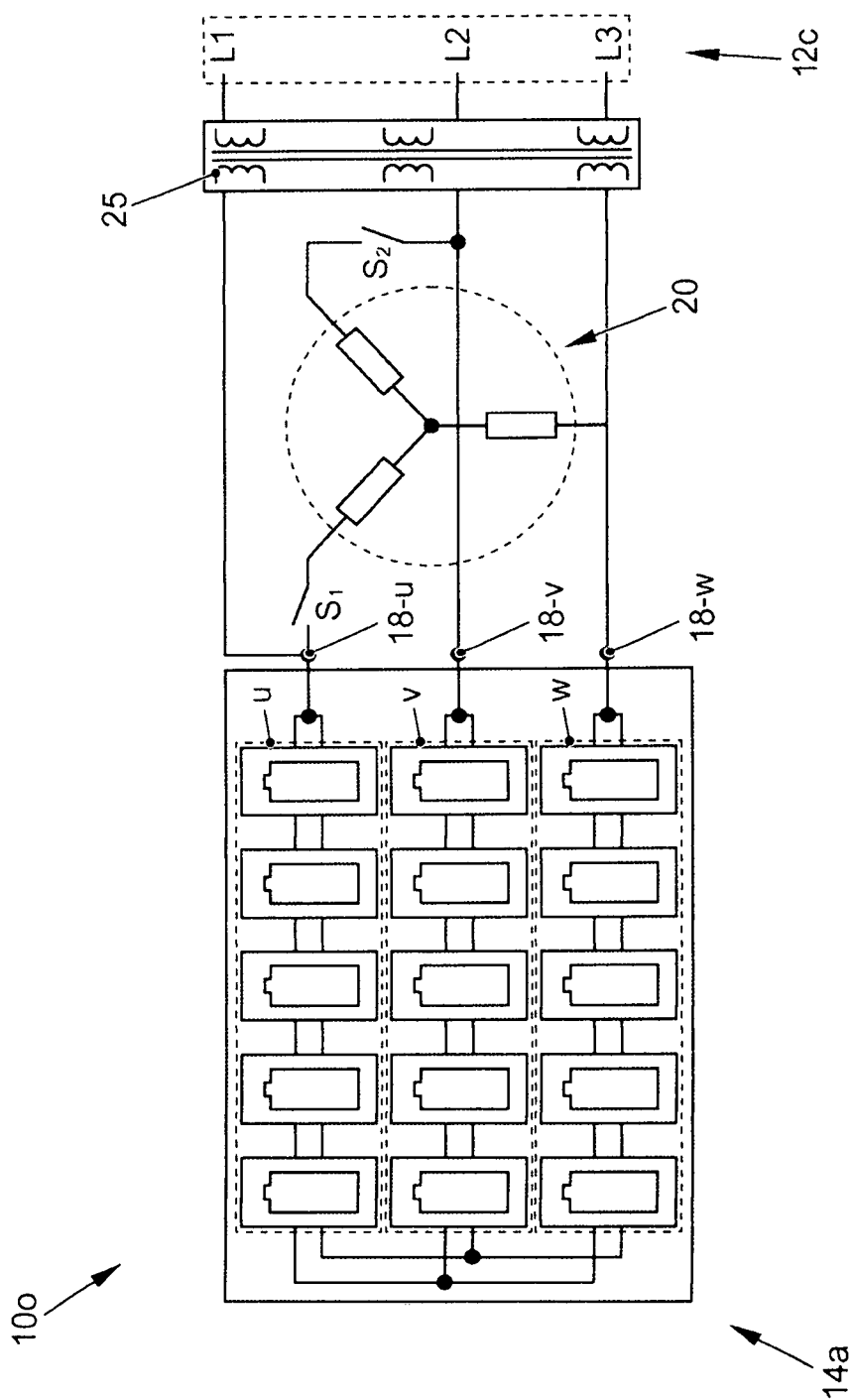

The circuit diagram shown in FIG. 9*d* differs from the circuit diagram 10*n* of FIG. 9*c* only in that the transformer 25 for DC isolation is connected downstream of the charging device 12*c*.

FIGS. 10*a* to 10*f* show further options for charging an energy store 14*c*. To this end, FIGS. 10*a* to 10*f* show circuit diagrams 10*p* to 10*u* in which embodiments in which the battery 14*c* is electrically connected to two voltage sources 12*a*, 12*b*, 12*c* are shown. The embodiments of FIGS. 10*a* to 10*f* described below make it possible to charge the energy store 14*c* both by means of direct current and by means of alternating current and both in a single-phase and three-phase manner. In any case, in the embodiments of FIGS. 10*a* to 10*f*, a respective three-phase voltage source 12*c* is provided, which has a plurality of phases, and a respective voltage source 12*a*, 12*b* is provided, which has just one phase. In this respect, the embodiments of FIGS. 10*a* to 10*f* illustrate a mixed form of the circuits described in FIGS. 8*a*, 8*b* and 3. The respective energy storage modules of the energy storage strings u, v, w are respectively connected in parallel with one another. The switches SSP1 and SSP2 isolate the star point of the battery 14*c*, as described above. To charge the battery 14*c* by means of the three-phase voltage source 12*c*, the switches SSP1 and SSP2 are open. To charge the battery 14*c* by means of the single-phase voltage source 12*a* or 12*b*, the switches SSP1 and SSP2 are to be closed.

The embodiments shown in circuit diagrams 10*p* to 10*u* have the switches SWK1 and SWK2, which are arranged at the points in the respective circuit diagrams 10*p* to 10*u* already described above, namely between the strings of the motor 20 in order to combine the strings of the motor 20.

The circuit diagrams 10*p* to 10*u* furthermore have three coils 30. Each coil 30 is electrically connected to a phase L1, L2, L3 and to a respective connection of the battery 14*c*.

Figure 10A:
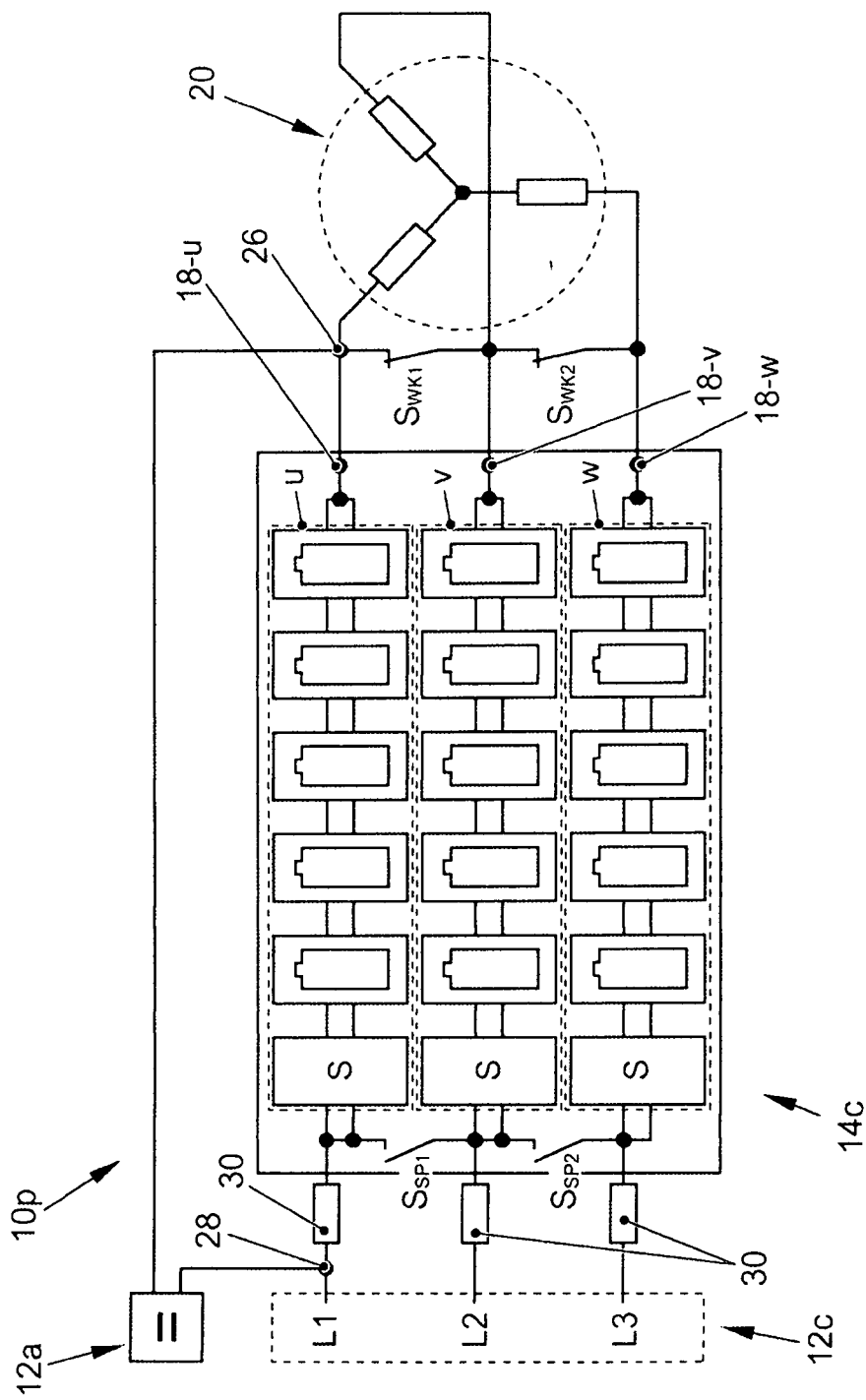
FIGS. 10a to 10f show further circuit diagrams according to yet other embodiments of the method according to the invention for charging an energy store.

In the embodiment shown by circuit diagram 10*p* in FIG. 10*a*, the already described battery 14*c* is electrically connected to a charging device 12*a*, a DC voltage source and to a charging device 12*c*, a three-phase voltage source.

The charging device 12*a* is connected to the battery 14*c* by way of its positive pole via a connection 26 and by way of its negative pole via a connection 28.

The phases L1, L2, L3 of the charging device 12*c* are each electrically connected to one of the coils 30.

Figure 10B:
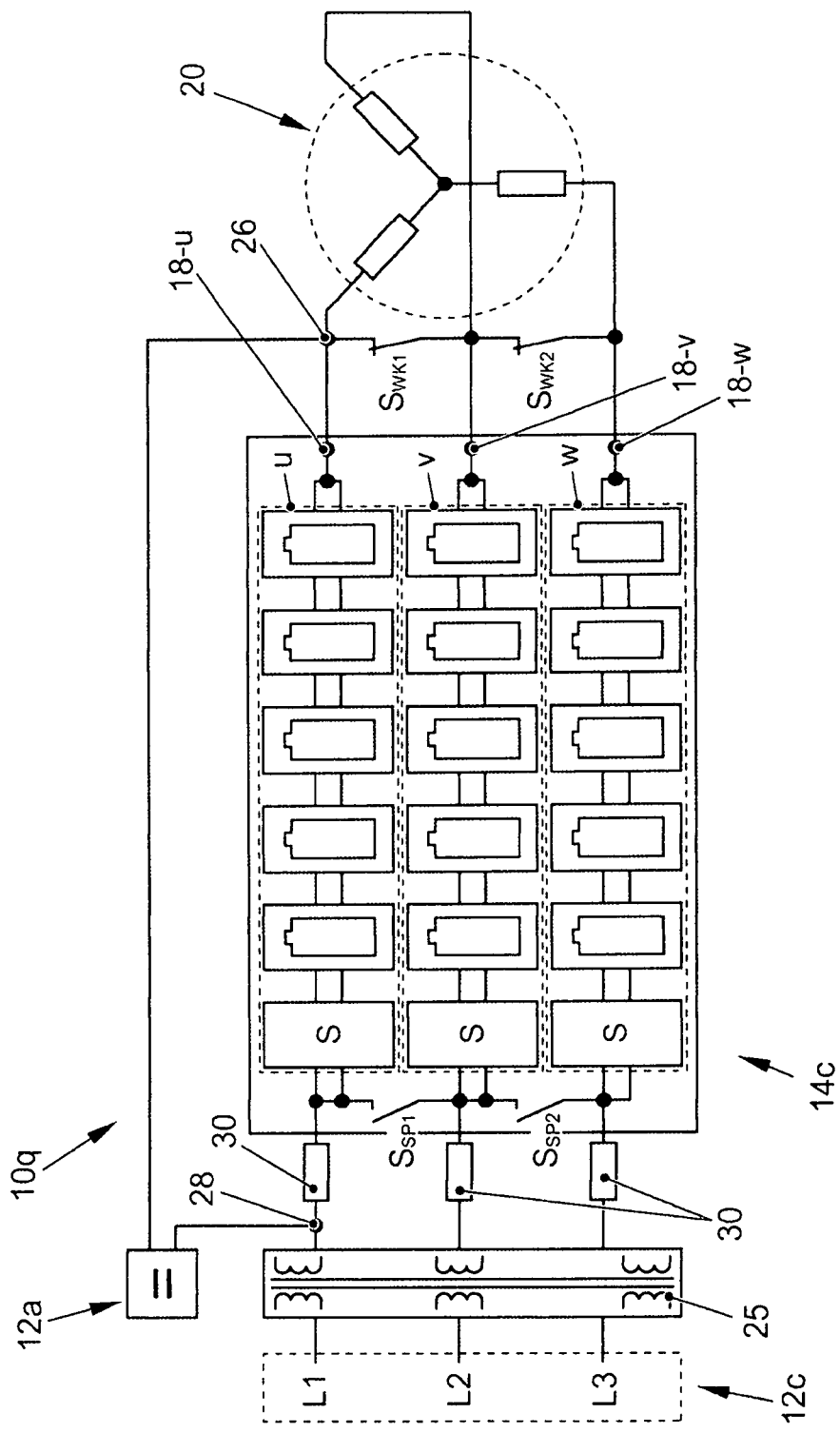

In the circuit diagram 10*q* shown in FIG. 10*b*, a transformer 25 for DC isolation is connected downstream of the charging device 12*c*.

Figure 10C:
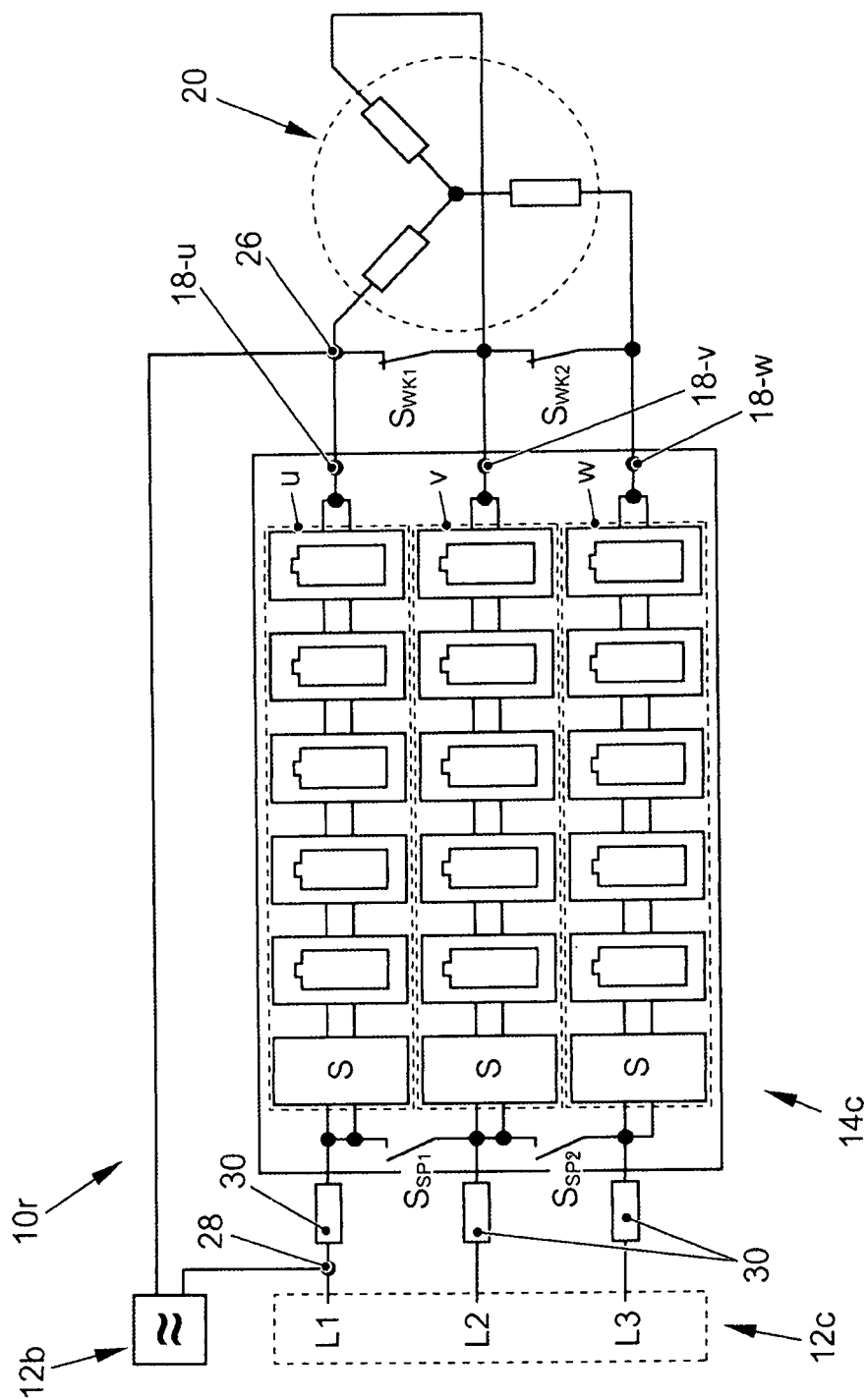

The circuit diagram 10*r* shown in FIG. 10*c* substantially corresponds to the circuit diagram 10*p* shown in FIG. 10*a*. In the circuit diagram 10*r*, however, the DC voltage source 12*a* is replaced by a single-phase AC voltage source 12*b*.

Figure 10D:
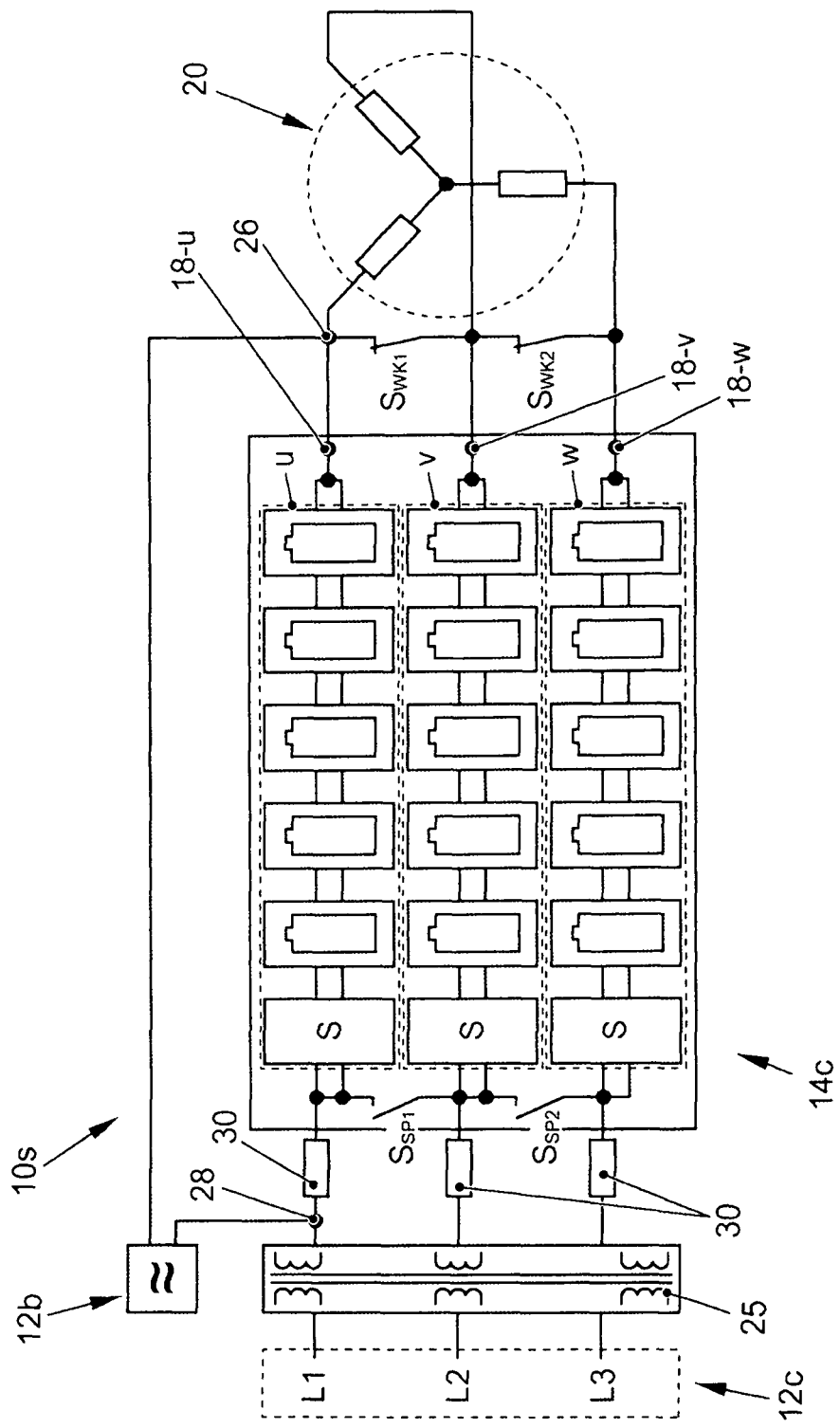
Figure 10E:
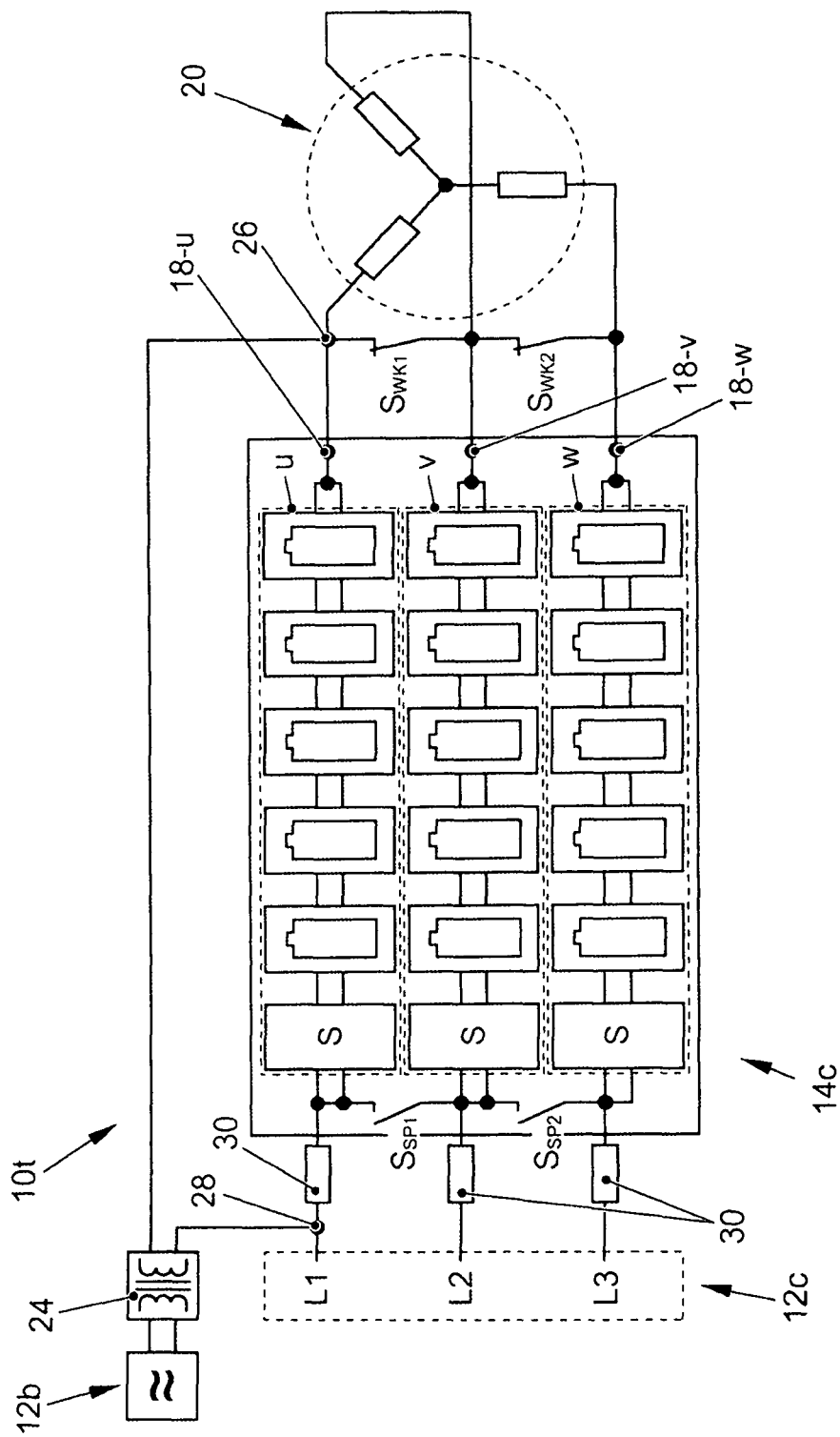
Figure 10F:
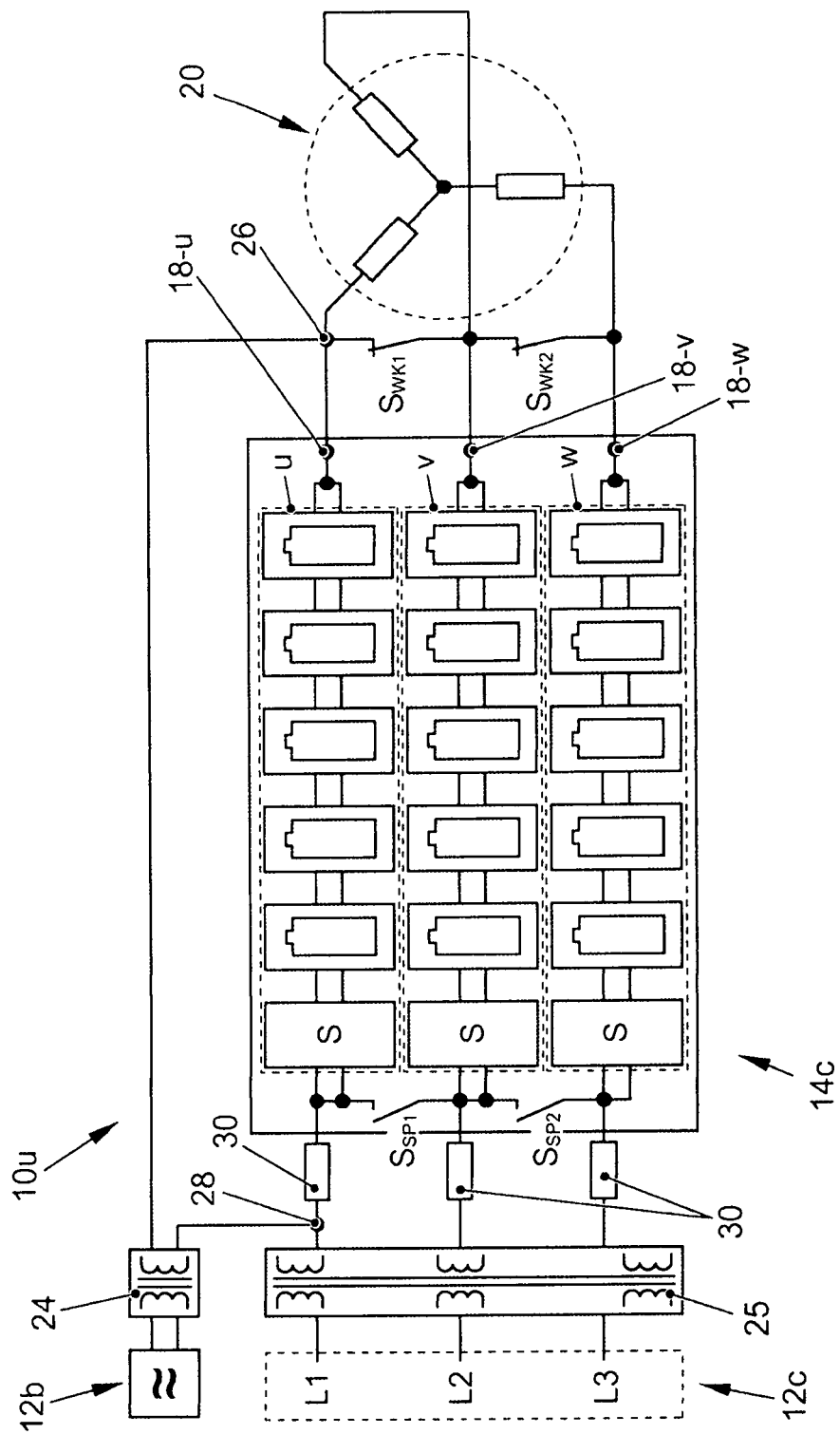

In the circuit diagrams 10*s* and 10*u* shown in FIG. 10*d* and FIG. 10*f*, a transformer 25 is connected downstream of the charging device 12*c* for the purpose of DC isolation.

In the circuit diagrams 10*t* and 10*u* shown in FIGS. 10*e* and 10*f*, a transformer 24 is connected downstream of the single-phase AC voltage source 12*b* for the purpose of DC isolation.

Figure 11:
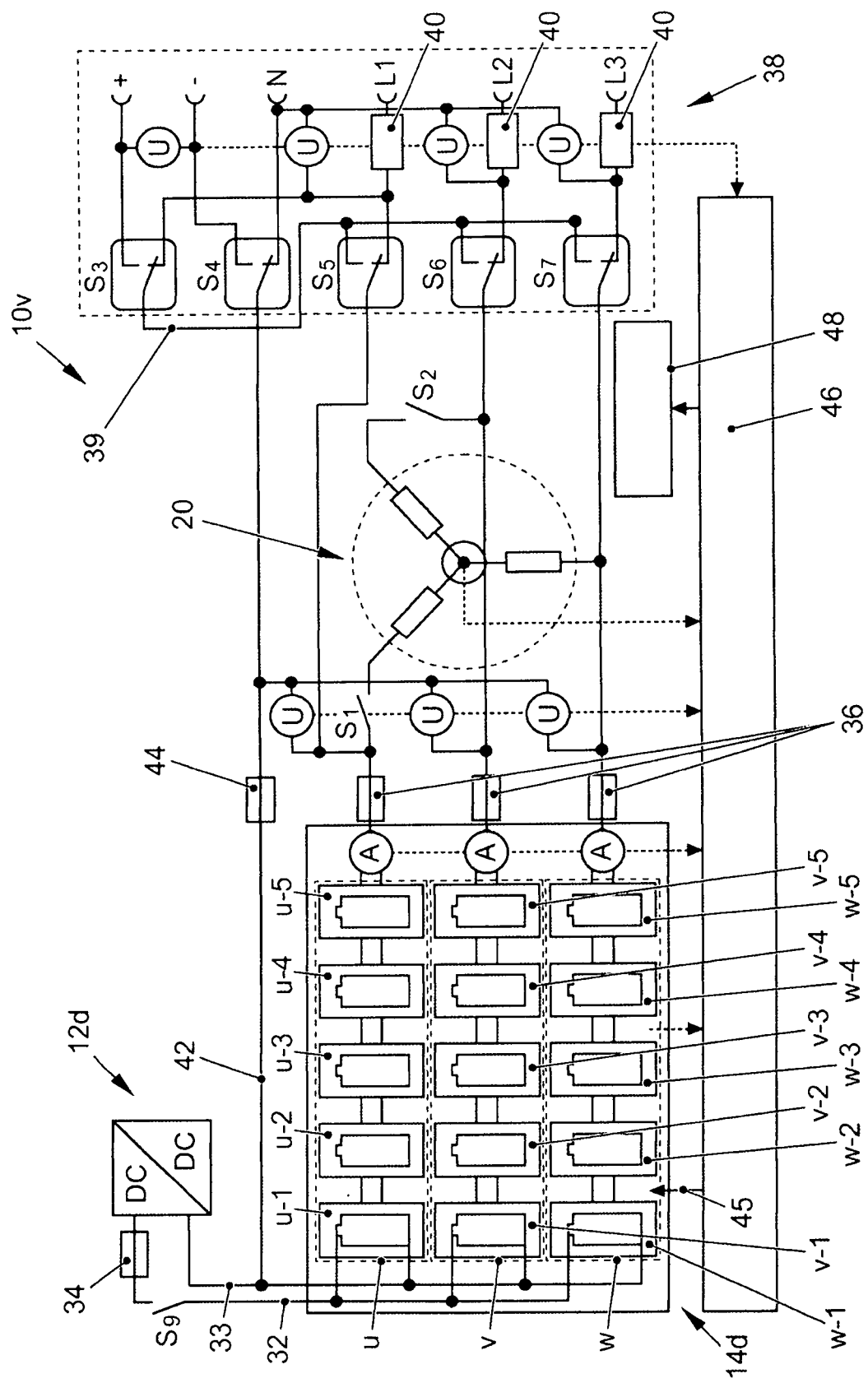
FIG. 11 shows a system circuit diagram for charging an energy store.

In FIG. 11, a system circuit diagram 10*v* is illustrated. An energy store 14*d* is electrically connected to a vehicle electrical system 12*d*. The vehicle electrical system 12*d* is configured to use a plurality of voltage levels as consumer voltage for respective consumers, for example 12 V and 48 V.

The energy store 14*d* has three energy storage strings u, v, w. Each energy storage string u, v, w has five respective energy storage modules u-1 to u-5, v-1 to v-5 and w-1 to w-5. In this instance, it should be noted that the number of energy storage modules can be as desired and hence there may also be more than five energy storage modules. The positive pole of the vehicle electrical system 12*d* is connected to a positive connection of a respective energy storage module u-1 or v-1 or w-1 via an electrical connection 32 in each case. The negative pole of the vehicle electrical system 12*d* is connected to a negative connection of a respective energy storage module u-1 or v-1 or w-1 via an electrical connection 33 in each case. The forward line 32 from the positive pole of the vehicle electrical system 12*d* to the battery 14*d* contains a contactor 34 and a switch S9 arranged in series. Otherwise, the respective modules u-1 to u-5, v-1 to v-5 and w-1 to w-5 are each connected in parallel. Arranged at the motor-side end of the strings u, v, w is a respective ammeter denoted "A". Said ammeter has a respective contactor 36 connected downstream of it.

The strings u, v, w are each electrically connected to a respective string of a motor 20. There is a switch S1 arranged in the electrical connection from string u to the motor 20 and a switch S2 arranged in the electrical connection from string v to the motor 20, in order to isolate or connect said motor if need be depending on the operating function. The motor 20 has a charging apparatus 38 electrically connected to it. The charging apparatus 38, to charge the battery 14*d*, is connected to respective energy sources providing a charging voltage, possible energy sources being DC voltage sources and/or AC voltage sources.

The charging apparatus 38 has multiple connections L1, L2, L3 for connection to respective phases of a three-phase grid. In addition, the charging apparatus 38 has a neutral connection N. Finally, the charging apparatus 38 has connections "+" and "−" for connection to a DC grid. To respectively connect or isolate the respective connection L1, L2, L3, N, "+", "−", these each have a switch S3 to S7 connected downstream of them. The switch S4 is configured to switch between the connection "−" and the connection N. The switches S5, S6, S7 are configured to switch between the respective phase connection L1, L2, L3 or a coupling string 39. The switch S3 is configured to connect the connection "+" or the connection of the phase L1 to the coupling string 39. The connections L1, L2 and L3 moreover each have a coil 40. Arranged in parallel between the connection N and the respective connections L1, L2 and L3 is a respective voltmeter denoted by "U". A voltmeter denoted by "U" is moreover arranged between the connection "+" and the connection "−".

The connection N or the connection "−", depending on the respective position of the switch S4, has an electrical connection 42 to the negative pole of the vehicle electrical system 12*d* or to the electrical connection 33. The electrical connection 42 has a contactor 44. Voltmeters, each denoted by "U", are arranged between the electrical connection 42 and the respective strings u, v, w in a manner connected in parallel with the latter, so that a voltage between the respective string u, v, w and the electrical connection 42 is determinable.

The respective voltmeters "U" and ammeters "A", the motor 20 or a resolver of the motor 20 and the battery 14*d* send measurement data, such as e.g. individual cell voltages of the individual energy storage modules or the temperature, to a central controller 46 of the battery 14*d*. The central controller 46 has a high-speed bus 45 to control the respective switches of the energy storage modules u-1 to u-5, v-1 to v-5 and w-1 to w-5. The central controller 46 also has a switch controller 48 connected to it to control the switches S1 to S9.

Figure 12A:
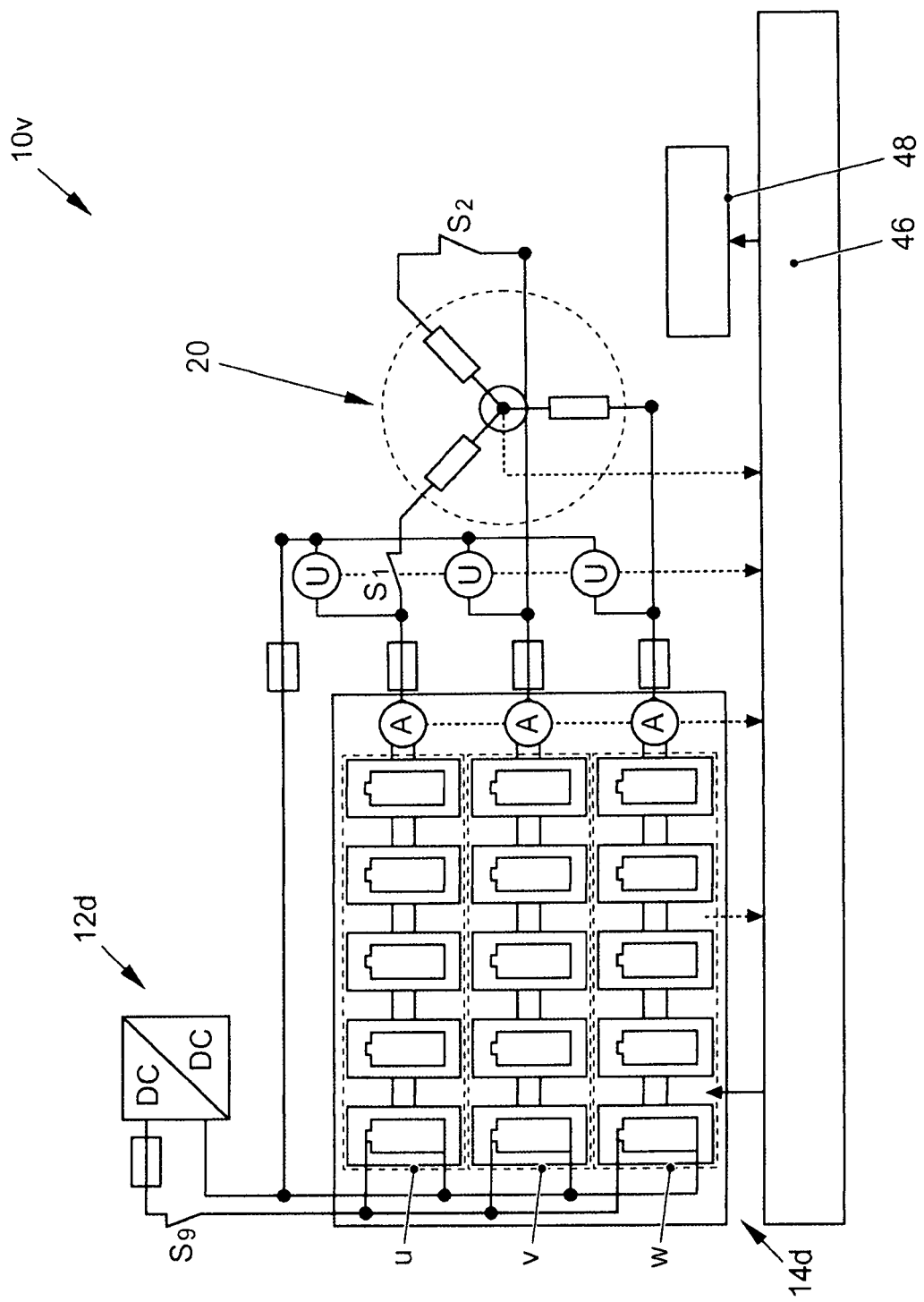
FIGS. 12a to 12d show operational functions of the system circuit diagram of FIG. 11.

FIG. 12*a* shows the system circuit diagram 10*v* in a manner in which it is connected during motor operation, that is to say when the battery 14*d* supplies the motor 20 with power. For the sake of clarity, elements of the system circuit diagram 10*v* from FIG. 11 that are not needed are not shown.

For motor operation, the switch S9 is closed. As a result, the vehicle electrical system 12*d* has its respective positive pole and its respective negative pole electrically connected to the battery 14*d*. The switches S1 and S2 are also closed, as a result of which the battery 14*d* and the motor 20 are electrically connected to one another. The switches S3 to S7 are switched such that they perform no function, or the charging apparatus 38 is isolated. To this end, switches S3 to S7 are open, or switched to a center position between the respective possible end positions, so that none of the end positions is electrically connected. Switching elements other than those shown, which permit an open position besides multiple further functional positions, are alternatively possible.

Figure 12B:
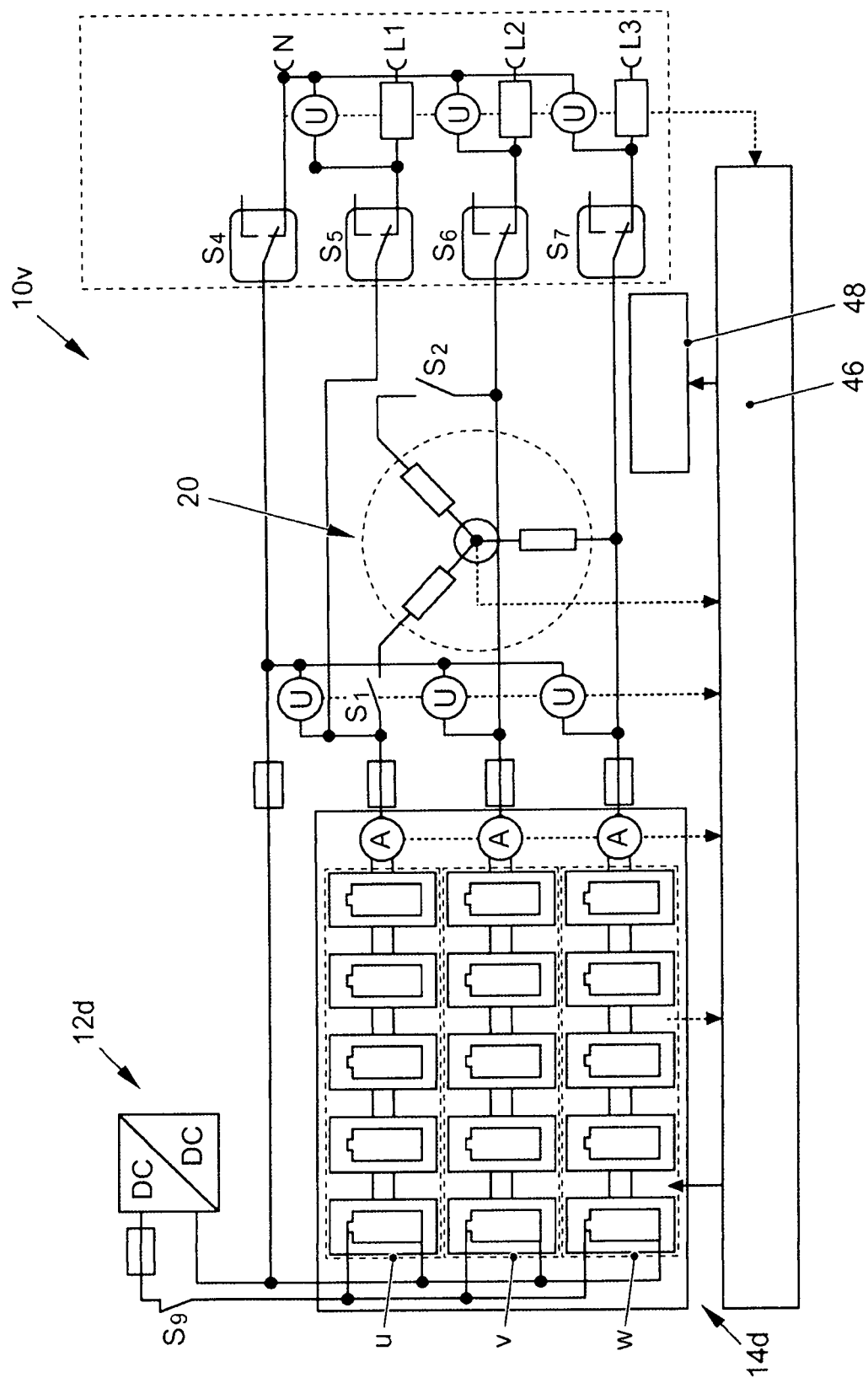

FIG. 12*b* shows the circuit diagram 10*v* of FIG. 11 in the switching state that exists when the battery 14*d* is charged with alternating current in a three-phase manner. This function substantially corresponds to the features described in FIGS. 9*a* to 9*d*. The switch controller 48 has closed the switch S9, as a result of which the vehicle electrical system 12*d* is connected to the battery 14*d*, and the switches S1 and S2 are open so that the respective strings of the motor 20 are isolated from the battery 14*d*. The switches S5, S6 and S7 are switched so that the phase connections L1, L2 and L3 are connected to the respective strings u, v, w of the battery 14*d*.

The switch S5 connects the connection of the phase L1 to the string u of the battery 14d, the switch S6 connects the connection of the phase L2 to the string v of the battery 14d and the switch S7 connects the connection of the phase L3 to the string w of the battery 14d. The switch S4 is switched so that the connection N is connected to the negative pole of the vehicle electrical system 12d, as a result of which the circuit is closed. The current is therefore drawn via the phases L1, L2, L3 and the neutral conductor. In this configuration, the battery 14d can now be charged in a three-phase manner.

Figure 12C:
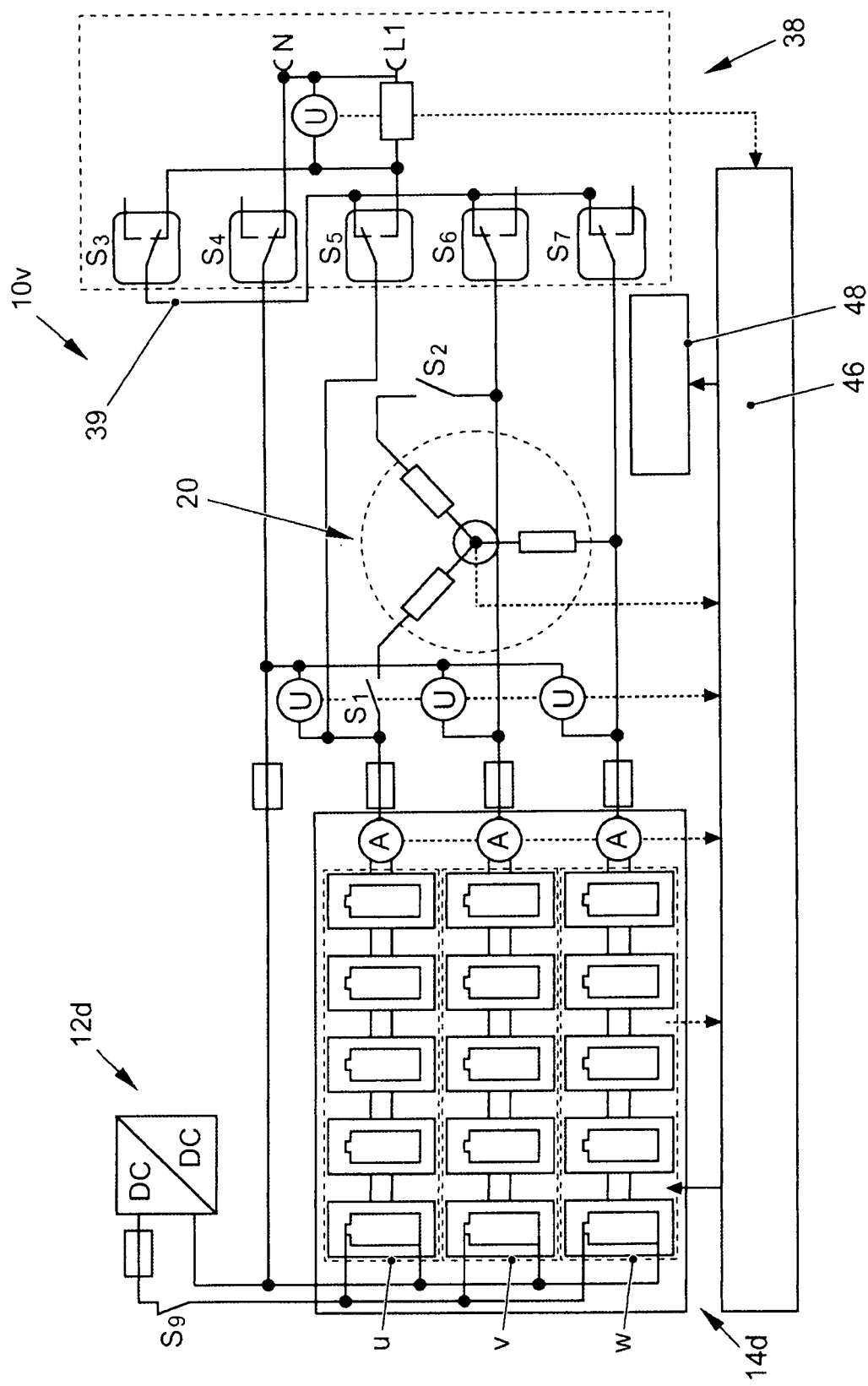

FIG. 12c shows the circuit diagram 10v in the switching state that exists when the battery 14d is charged with alternating current in a single-phase manner. To this end, the switch controller 48 has closed the switch S9, as a result of which the vehicle electrical system 12d is connected to the battery 14d, and the switches S1 and S2 are open so that the respective strings of the motor 20 are isolated from the battery 14d. The switches S3, S5, S6 and S7 are switched so that the phase connection L1 is electrically connected to the strings u, v, w of the battery 14d. The switch S3 is switched so that the connection of the phase L1 to the coupling string is connected. The switches S5, S6 and S7 are switched so that the respective strings u, v, w of the battery 14d are likewise connected to the coupling string 39 (see FIG. 11). Current can therefore flow from the connection of the phase L1 via the switch S3, the coupling string 39, the switches S5, S6, S7 into the respective strings u, v, w of the battery 14d and charge the battery 14d. Switch S4 is switched so that the connection N is connected to the negative pole of the vehicle electrical system 12d, as a result of which the circuit is closed. The current is therefore drawn via the phase L1 and the neutral conductor. In this configuration, the battery 14d can now be charged in a single-phase manner from the phase L1.

Figure 12D:
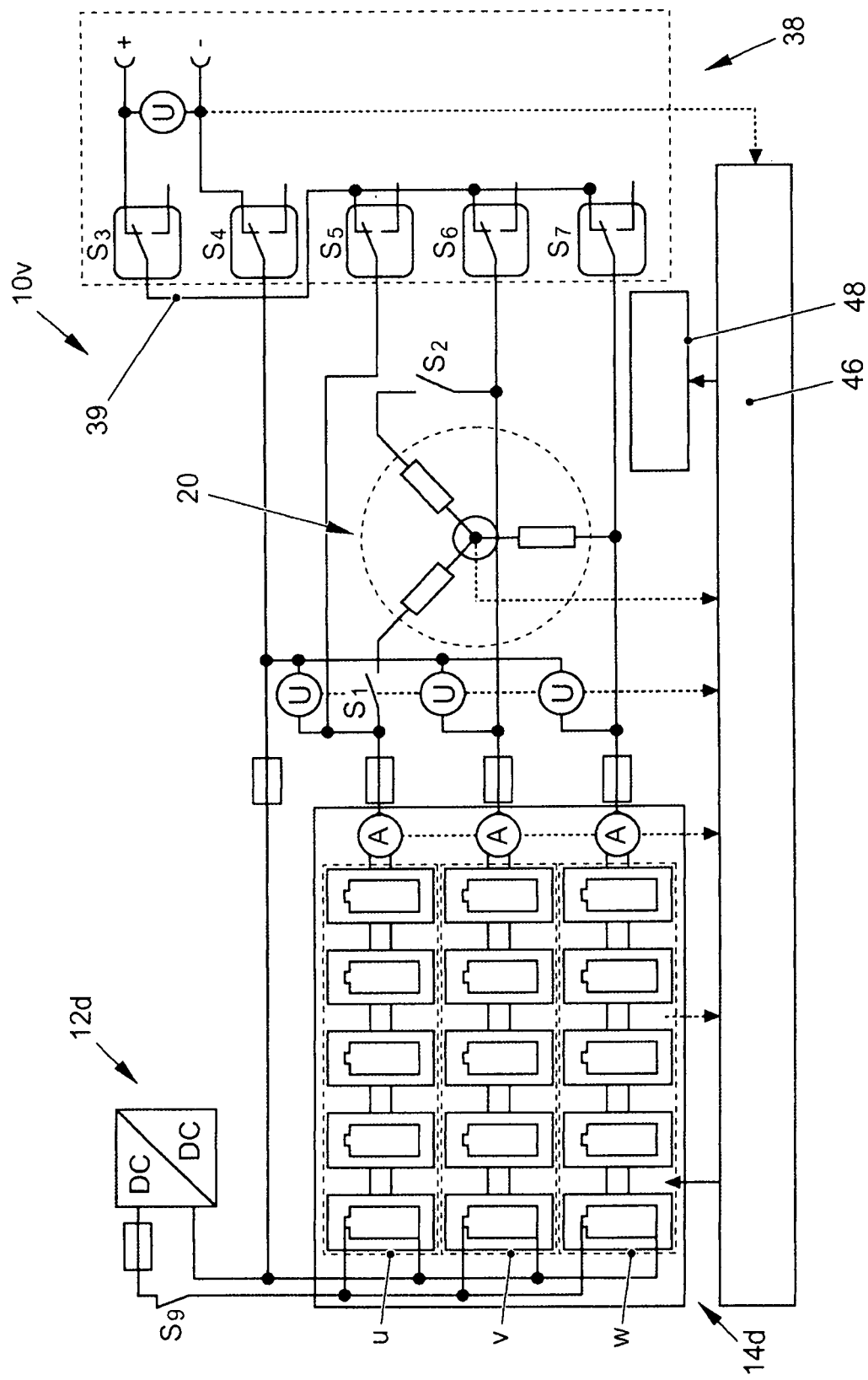

FIG. 12d shows the circuit diagram 10v in the switching state that exists when the battery 14d is charged with direct current. To this end, the switch controller 48 has closed the switch S9, as a result of which the vehicle electrical system 12d is connected to the battery 14d, and the switches S1 and S2 are open so that the respective strings of the motor 20 are isolated from the battery 14d. The switches S3, S5, S6 and S7 are switched so that the connection "+" is electrically connected to the strings u, v, w of the battery 14d. To this end, the switch S3 is switched so that the connection "+" is connected to the coupling string. The switches S5, S6 and S7 are switched so that the respective strings u, v, w of the battery 14d are likewise connected to the coupling string 39 (see FIG. 11). Current can therefore flow from the connection "+" via the switch S3, the coupling string 39 and the switches S5, S6, S7 into the respective strings u, v, w of the battery 14d and charge the battery 14d. The switch S4 is switched so that the connection "−" is connected to the negative pole of the vehicle electrical system 12d, as a result of which the circuit is closed. In this configuration, the battery 14d can now be charged by way of direct current.

The invention claimed is:

1. A method for charging an energy store that has at least three energy storage strings, with each of the energy storage strings having a plurality of energy storage modules and each of the energy storage modules having at least one energy storage element that can receive and store energy, the energy storage strings being connected to at least one star point, the energy store further having at least two switching elements, and the energy store being electrically connected to an electric machine, the method comprising:

connecting the star point of the energy store to an energy source that provides a charging voltage;

operating the at least two switching elements in accordance with whether the energy source is a DC voltage source or an AC voltage source so that the respective energy storage modules of at least one of the energy storage strings are each connected in parallel or in series with one another and/or so that at least one of the energy storage modules of at least one of the energy storage strings is bypassed;

directly electrically connecting an output connection of the energy source to an input connection at the star point of the energy store; and charging the energy storage modules with the charging voltage provided from the energy source to the energy store via the star point of the energy store.

2. The method as claimed in claim 1, wherein the energy store is an AC battery.

3. The method as claimed in claim 2, wherein the respective energy storage modules are each connected in series or each in parallel or at least partly in series and partly in parallel with one another in a respective energy storage string by correspondingly switching the switching elements of the energy storage modules.

4. The method as claimed claim 3, wherein at least two energy storage strings are connected in series with one another.

5. The method as claimed in claim 3, wherein the at least three energy storage strings are connected in parallel with one another.

6. The method as claimed in claim 5, wherein the energy storage modules are charged in a single-phase or three-phase manner.

7. The method as claimed in claim 1, wherein a return line of the electrical connection from the energy store to the energy source is connected via a star point of the energy store.

8. The method as claimed in claim 1, wherein the energy source is the AC voltage source and the method further comprising operating the at least two switching mechanisms selectively so that the energy source is DC isolated or alternatively not DC isolated from the energy store.

9. The method as claimed in claim 1, wherein an output connection of the energy source is electrically connected to a connection of the electric machine.

10. An apparatus connectable to an energy source that provides a charging voltage, the apparatus being electrically connected to an electric machine, the apparatus comprising:

an energy store that has at least three energy storage strings, each of the energy storage strings having a plurality of energy storage modules, and each of the respective energy storage modules having at least one energy storage cell that is designed to receive and store energy from the energy source;

at least two switching elements that are operable in accordance with whether the energy source comprises a DC voltage source and/or an AC voltage source, with the energy store being matched to the energy source by switching the switching elements so that the respective energy storage modules of the energy storage strings are each connected in parallel and/or in series with one another and/or at least one energy storage module of at least one energy storage string is bypassed; and a star point connected to each of the at least three storage strings and directly connected to the energy source to provide the charging voltage so that the energy storage modules are charged via the star point of the energy store.

11. The apparatus as claimed in claim 10, wherein the respective energy storage modules are each connected in series or each in parallel or at least partly in series and partly in parallel with one another in a respective energy storage string by correspondingly switching the switching elements of the energy storage modules.

12. The apparatus as claimed in claim 11, wherein at least two of the energy storage strings are connected in series with one another.

13. The apparatus as claimed in claim 11, wherein the at least three energy storage strings are connected in parallel with one another.

* * * * *